US012694832B2

(12) United States Patent
Park et al.

(10) Patent No.: US 12,694,832 B2
(45) Date of Patent: Jul. 28, 2026

(54) DISPLAY DEVICE

(71) Applicant: Samsung Display Co., LTD., Yongin-si (KR)

(72) Inventors: Junhyun Park, Yongin-si (KR); Hyeongseok Kim, Yongin-si (KR); Heejean Park, Yongin-si (KR); Sunhwa Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/978,196

(22) Filed: Dec. 12, 2024

(65) Prior Publication Data

US 2025/0252920 A1 Aug. 7, 2025

(30) Foreign Application Priority Data

Feb. 7, 2024 (KR) ........................ 10-2024-0018661

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0842* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,586,491 B2 | 3/2020 | Chaji et al. | | |
| 2008/0074363 A1 | 3/2008 | Yamashita et al. | | |
| 2011/0109299 A1* | 5/2011 | Chaji | .................. | G09G 3/3283 324/76.11 |
| 2019/0088731 A1* | 3/2019 | Lee | .................... | H10D 30/6757 |

(Continued)

FOREIGN PATENT DOCUMENTS

| | | | |
|---|---|---|---|
| KR | 102028996 | B1 | 10/2019 |
| KR | 1020230001027 | A | 1/2023 |

(Continued)

OTHER PUBLICATIONS

Partial European Search Report, Application No. 25150926.1, mailed May 21, 2025; 18 pages.

*Primary Examiner* — Ifedayo B Iluyomade
(74) *Attorney, Agent, or Firm* — CANTOR COLBURN LLP

(57) ABSTRACT

A display device includes pixels, each including a first transistor including a gate connected to a first node, a source connected to a second node, and a drain connected to a third node, a second transistor including a gate configured to receive a first gate signal, a source configured to receive a data voltage, and a drain connected to a fourth node, a third transistor including a gate configured to receive a second gate signal, a source connected to the third node, and a drain connected to the first node, a storage capacitor including a first terminal connected to the first node and a second terminal connected to the fourth node, and a light emitting element including a first terminal connected to a fifth node and a second terminal configured to receive a second power voltage. At least two of the pixels share at least two transistors.

25 Claims, 23 Drawing Sheets

(56) References Cited

U.S. PATENT DOCUMENTS

| | | | | |
|---|---|---|---|---|
| 2022/0076622 | A1 | 3/2022 | Feng et al. | |
| 2022/0139319 | A1* | 5/2022 | Oh | G09G 3/3233 345/204 |
| 2023/0206834 | A1 | 6/2023 | Liu et al. | |
| 2023/0306906 | A1 | 9/2023 | Yang et al. | |

FOREIGN PATENT DOCUMENTS

| | | | |
|---|---|---|---|
| KR | 102527216 | B1 | 4/2023 |
| KR | 102544046 | B1 | 6/2023 |
| KR | 102693009 | B1 | 8/2024 |

* cited by examiner

DISPLAY DEVICE

This application claims priority to Korean Patent Application No. 10-2024-0018661 filed on Feb. 7, 2024, and all the benefits accruing therefrom under 35 U.S.C. § 119, the content of which in its entirety is herein incorporated by reference.

BACKGROUND

1. Field

Embodiments relate to a display device. More particularly, embodiments relate to a display device including pixels supportive of a variable refresh rate and high speed driving.

2. Description of the Related Art

A display device may include a plurality of pixels. Each of the pixels may include a plurality of transistors including a driving transistor, at least one capacitor, and a light emitting element. The driving transistor may generate a driving current, and the light emitting element may emit light with a luminance corresponding to the driving current.

In order to improve driving efficiency of the display device and minimize power consumption of the display device, some approaches may use variable refresh rate ("VRR") driving, which varies a driving frequency (or refresh rate) of the display device. Further, in order to drive the display device at high speed, some approaches may use separated compensation driving ("SCD"), which separates a threshold voltage compensation period of the driving transistor and a data writing period.

However, when VRR driving and SCD are adopted, problems such as, for example, flicker phenomenon, image quality unevenness, and the like may occur, and some approaches for compensating for such problems may increase the number of transistors included in the pixel and the number of voltages provided to the pixel.

SUMMARY

Embodiments provide a display device in which the number of transistors included in a pixel is reduced.

In a display device including a plurality of pixels according to embodiments, each of the plurality of pixels may include a first transistor including a gate connected to a first node, a source connected to a second node, and a drain connected to a third node, a second transistor including a gate configured to receive a first gate signal, a source configured to receive a data voltage, and a drain connected to a fourth node, a third transistor including a gate configured to receive a second gate signal, a source connected to the third node, and a drain connected to the first node, a storage capacitor including a first terminal connected to the first node and a second terminal connected to the fourth node, and a light emitting element including a first terminal connected to a fifth node and a second terminal configured to receive a second power voltage. At least two pixels among the plurality of pixels may share at least two transistors connected to the second node.

In an embodiment, the plurality of pixels may include a first pixel and a second pixel disposed in a same pixel row and adjacent to each other, and the first pixel and the second pixel may share the at least two transistors.

In an embodiment, the first pixel may be a first one of a red pixel, a green pixel, and a blue pixel, and the second pixel may be a second one of the red pixel, the green pixel, and the blue pixel.

In an embodiment, the plurality of pixels may include a first pixel, a second pixel, and a third pixel disposed in a same pixel row and adjacent to each other, and the first pixel, the second pixel, and the third pixel may share the at least two transistors.

In an embodiment, the first pixel may be a first one of a red pixel, a green pixel, and a blue pixel, the second pixel may be a second one of the red pixel, the green pixel, and the blue pixel, and the third pixel may be a third one of the red pixel, the green pixel, and the blue pixel.

In an embodiment, the at least two transistors may include an eighth transistor including a gate configured to receive a first emission signal, a source configured to receive a first power voltage, and a drain connected to the second node, and a ninth transistor including a gate configured to receive a fourth gate signal, a source configured to receive a bias voltage, and a drain connected to the second node.

In an embodiment, the at least two transistors may further include a tenth transistor including a gate configured to receive the second gate signal, a source configured to receive the first power voltage, and a drain connected to the second node.

In an embodiment, each of the plurality of pixels may further include a fifth transistor including a gate configured to receive the second gate signal, a source configured to receive a reference voltage, and a drain connected to the fourth node, a sixth transistor including a gate configured to receive the first emission signal, a source connected to the third node, and a drain connected to the fifth node, and a seventh transistor including a gate configured to receive the fourth gate signal, a source configured to receive a second initialization voltage, and a drain connected to the fifth node.

In an embodiment, each of the plurality of pixels may further include a sixth transistor including a gate configured to receive a second emission signal, a source connected to the third node, and a drain connected to the fifth node, and a seventh transistor including a gate configured to receive the fourth gate signal, a source configured to receive a second initialization voltage, and a drain connected to the fifth node.

In an embodiment, each of the plurality of pixels may further include a fifth transistor including a gate configured to receive the second gate signal, a source configured to receive a reference voltage, and a drain connected to the fourth node.

In an embodiment, each of the plurality of pixels may further include a fifth transistor including a gate configured to receive the second gate signal, a source connected to the second node, and a drain connected to the fourth node.

In an embodiment, each of the plurality of pixels may further include a fourth transistor including a gate configured to receive a third gate signal, a source configured to receive a first initialization voltage, and a drain connected to the first node, and a hold capacitor including a first terminal connected to the fourth node and a second terminal configured to receive a first power voltage.

In a display device including a plurality of pixels according to embodiments, each of the plurality of pixels may include a first transistor including a gate connected to a first node, a source connected to a second node, and a drain connected to a third node, a second transistor including a gate configured to receive a first gate signal, a source configured to receive a data voltage, and a drain connected to a fourth node, a third transistor including a gate configured to receive a second gate signal, a source connected to the third node, and a drain connected to the first node, a storage capacitor including a first terminal connected to the first node and a second terminal connected to the fourth node, and a light emitting element including a first terminal connected to a fifth node and a second terminal configured to receive a second power voltage. At least two pixels among the plurality of pixels may share a ninth transistor including a gate configured to receive a fourth gate signal, a source configured to receive a bias voltage, and a drain connected to the second node.

In an embodiment, the at least two pixels may further share a tenth transistor including a gate configured to receive the second gate signal, a source configured to receive a first power voltage, and a drain connected to the second node.

In a display device including a first pixel area, a second pixel area, and a third pixel area according to embodiments, each of the first pixel area, the second pixel area, and the third pixel area may include an active layer disposed on a substrate and including a first source area, a first drain area, a second source area, a second drain area, a third source area, and a third drain area, a first conductive layer disposed on the active layer and including a first gate electrode which defines a first transistor together with the first source area and the first drain area, a second gate electrode which defines a second transistor together with the second source area and the second drain area, and a third gate electrode which defines a third transistor together with the third source area and the third drain area, a second conductive layer disposed on the first conductive layer and including a first capacitor electrode overlapping the first gate electrode, a third conductive layer disposed on the second conductive layer and including a second capacitor electrode overlapping the first capacitor electrode, and a fourth conductive layer disposed on the third conductive layer. The first pixel area and the second pixel area may share the first source area. The first source area of the third pixel area may be connected to the first source area shared by the first pixel area and the second pixel area through a bridge disposed on a layer different from the active layer.

In an embodiment, the first pixel area, the second pixel area, and the third pixel area may be disposed in a same pixel row, and the second pixel area may be adjacent the first pixel area and the third pixel area.

In an embodiment, a shape of the first pixel area and a shape of the second pixel area may be symmetrical to each other with respect to an imaginary line extending in a pixel column direction between the first pixel area and the second pixel area.

In an embodiment, the first pixel area and the third pixel area may have a same shape.

In an embodiment, the fourth conductive layer may include the bridge.

In an embodiment, the fourth conductive layer may further include a first gate line connected to the second gate electrode and a second gate line connected to the third gate electrode.

In an embodiment, the first source area shared by the first pixel area and the second pixel area may include a first protrusion extending in a pixel row direction, and a first end portion of the bridge may be connected to the first protrusion.

In an embodiment, the first source area of the third pixel area may include a second protrusion extending in the pixel row direction, and a second end portion of the bridge may be connected to the second protrusion.

In an embodiment, the active layer of each of the first pixel area and the second pixel area may further include an eighth source area, an eighth drain area, a ninth source area, a ninth drain area, a tenth source area, and a tenth drain area, and the first pixel area and the second pixel area may share the eighth source area, the eighth drain area, the tenth source area, and the tenth drain area.

In an embodiment, the first conductive layer of each of the first pixel area and the second pixel area may further include an eighth gate electrode which defines an eighth transistor together with the eighth source area and the eighth drain area, a ninth gate electrode which defines a ninth transistor together with the ninth source area and ninth drain area, and a tenth gate electrode which defines a tenth transistor together with the tenth source area and the tenth drain area.

In an embodiment, each of the first pixel area, the second pixel area, and the third pixel area may further include a fifth conductive layer disposed on the fourth conductive layer and including a data line electrically connected to the second source area and a power line electrically connected to the second capacitor electrode.

In the display device according to the embodiments, at least two pixels may share at least two transistors connected to the source of the first transistor (or the second node), such that the number of transistors included in the pixel may be reduced. Accordingly, a resolution of the display device may be increased.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
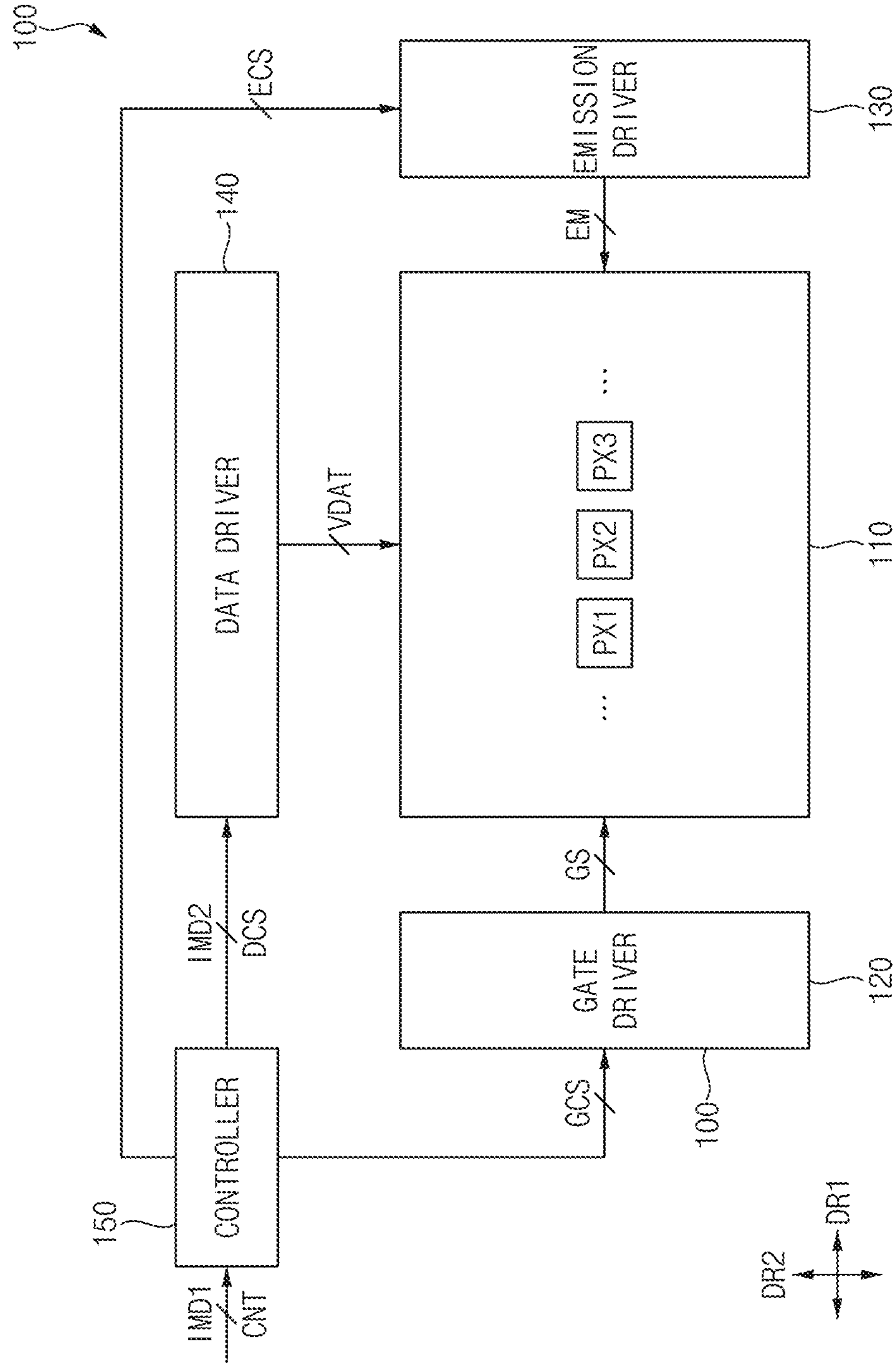
FIG. 1 is a block diagram illustrating a display device according to an embodiment.

Hereinafter, a display device according to embodiments of the present disclosure will be described in more detail with reference to the accompanying drawings. The same or similar reference numerals will be used for the same elements in the accompanying drawings.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

The terms "about" or "approximately" as used herein are inclusive of the stated value and include a suitable range of deviation for the particular value as determined by one of ordinary skill in the art, considering the measurement in question and the error associated with measurement of the particular quantity. The term "about" can mean within one or more standard deviations, or within +30%, 20%, 10%, 5% of the stated value, for example.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display device 100 according to an embodiment.

Referring to FIG. 1, the display device 100 may include a display panel 110, a gate driver 120, an emission driver 130, a data driver 140, and a controller 150.

The display panel 110 may include a plurality of pixels. At least two pixels among the plurality of pixels may share at least two transistors connected to a source of a first transistor (e.g., driving transistor). Accordingly, the number of transistors included in the pixel may decrease, and a resolution of the display device 100 may increase.

The plurality of pixels may include a first pixel PX1, a second pixel PX2, and a third pixel PX3. The first pixel PX1, the second pixel PX2, and the third pixel PX3 may be disposed in the same pixel row, and two or more of the first pixel PX1, the second pixel PX2, and the third pixel PX3 may be adjacent to each other. For example, the second pixel PX2 may be adjacent the first pixel PX1 and the third pixel PX3. For example, the first pixel PX1, the second pixel PX2, and the third pixel PX3 may be arranged in a first direction (or pixel row direction) DR1, and two or more of the first pixel PX1, the second pixel PX2, and the third pixel PX3 may be adjacent to each other in the first direction DR1. In some aspects, the first pixel PX1 may be adjacent another third pixel PX3 (not illustrated) (e.g., in the negative first direction DR1), and the third pixel PX3 may be adjacent another first pixel PX1 (not illustrated) (e.g., in the positive first direction DR1). Although not illustrated, the first pixel PX1, the second pixel PX2, and the third pixel PX3 may be adjacent another pixel (e.g., another first pixel PX1, second pixel PX2, or third pixel PX3) in the second direction DR2.

In an embodiment, the first pixel PX1 and the second pixel PX2 may share at least two transistors connected to the source of the first transistor. Accordingly, the number of transistors included in the first pixel PX1 and the second pixel PX2 may decrease by at least two, and the resolution of the display device 100 may increase.

In an embodiment, the first pixel PX1, the second pixel PX2, and the third pixel PX3 may share at least two transistors connected to the source of the first transistor. Accordingly, the number of transistors included in the first pixel PX1, the second pixel PX2, and the third pixel PX3 may decrease by at least four, and the resolution of the display device 100 may increase.

The gate driver 120 may provide gate signals GS to the display panel 110. The gate driver 120 may generate the gate signals GS based on a gate control signal GCS. In an embodiment, the gate control signal GCS may include a gate start signal, a gate clock signal, or the like.

The emission driver 130 may provide emission signals EM to the display panel 110. The emission driver 130 may generate the emission signals EM based on an emission control signal ECS. In an embodiment, the emission control signal ECS may include an emission start signal, an emission clock signal, or the like.

The data driver 140 may provide data voltages VDAT to the display panel 110. The data driver 140 may generate the data voltages VDAT based on second image data IMD2 and a data control signal DCS. In an embodiment, the second image data IMD2 may include grayscale values corresponding to the pixels, and the data control signal DCS may include a load signal, a data clock signal, or the like.

The controller 150 may control a driving (or operation) of the gate driver 120, a driving (or operation) of the emission driver 130, and a driving (or operation) of the data driver 140. The controller 150 may provide the gate control signal GCS to the gate driver 120, may provide the emission control signal ECS to the emission driver 130, and may provide the second image data IMD2 and the data control signal DCS to the data driver 140. The controller 150 may generate the gate control signal GCS, the emission control signal ECS, the second image data IMD2, and the data control signal DCS based on first image data IMD1 and a control signal CNT. In an embodiment, the first image data IMD1 may include grayscale values corresponding to the pixels, and the control signal CNT may include a horizontal start signal, a vertical start signal, a master clock signal, or the like.

Figure 2:
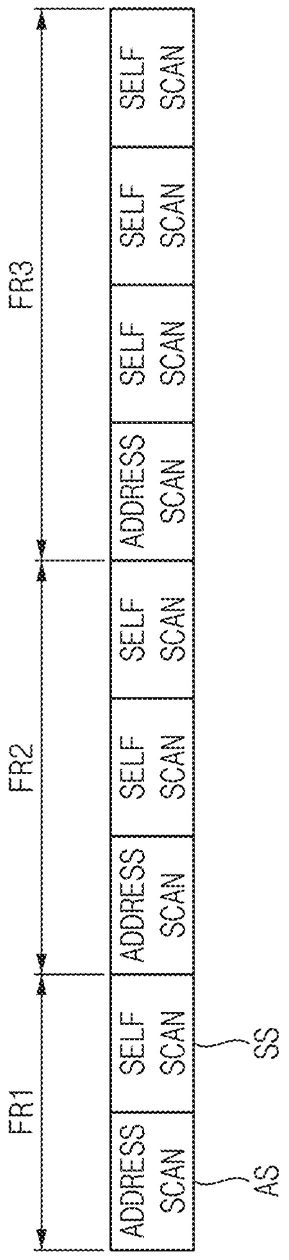
FIG. 2 is a view for describing a variable refresh rate driving of the display device of FIG. 1.

FIG. 2 is a view for describing a variable refresh rate ("VRR") driving of the display device 100 of FIG. 1.

Referring to FIGS. 1 and 2, a frame period of the display device 100 may include an address scan period AS and at least one self-scan period SS. The address scan period AS may be defined as a period in which the data voltages VDAT are applied to the display panel 110. In the address scan period AS, the display device 100 may display an image based on the data voltages VDAT applied in the address scan period AS. The self-scan period SS may be defined as a period in which the data voltages VDAT are not applied to the display panel 110. In the self-scan period SS, the display device 100 may display an image based on the data voltages VDAT applied in the address scan period AS.

The display device 100 may change a driving frequency (or refresh rate) of the display device 100 by adjusting the number of self-scan periods SS included in the frame period. The driving frequency of the display device 100 may increase as the number of self-scan periods SS included in the frame period decreases, and the driving frequency of the display device 100 may decrease as the number of self-scan periods SS included in the frame period increases.

In an embodiment, as illustrated in FIG. 2, when a first frame period FR1 includes one self-scan period SS, a second frame period FR2 includes two self-scan periods SS, and a third frame period FR3 includes three self-scan periods SS, a driving frequency of the second frame period FR2 may be less than a driving frequency of the first frame period FR1, and a driving frequency of the third frame period FR3 may be less than the driving frequency of the second frame period FR2. For example, the driving frequency of the first frame period FR1 may be about 120 Hz, the driving frequency of the second frame period FR2 may be about 80 Hz, and the driving frequency of the third frame period FR3 may be about 60 Hz.

Figure 3:
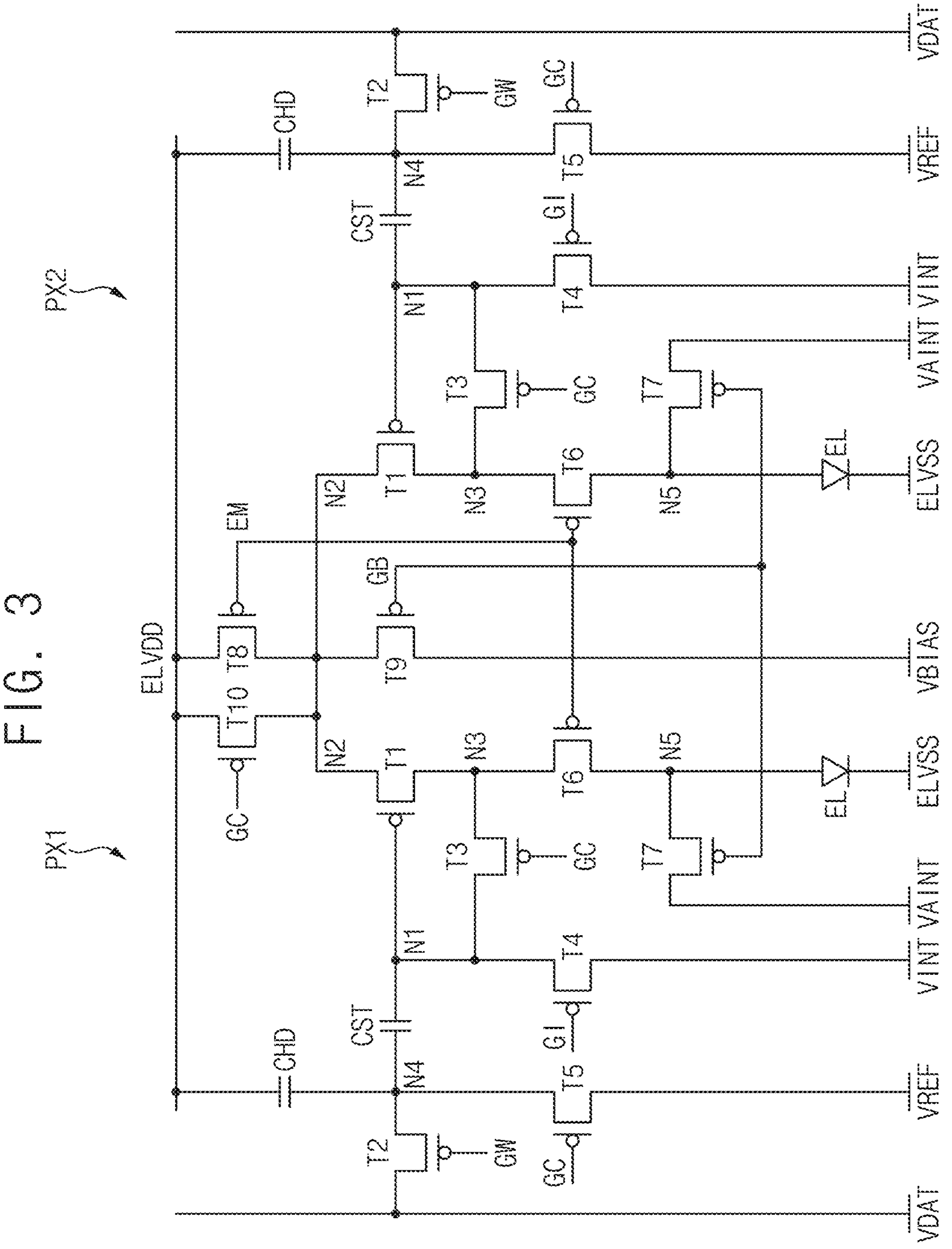
FIG. 3 is a circuit diagram illustrating an example of first and second pixels included in the display device of FIG. 1.

FIG. 3 is a circuit diagram illustrating an example of the first and second pixels PX1 and PX2 included in the display device 100 of FIG. 1.

Referring to FIGS. 1 and 3, each of the first pixel PX1 and the second pixel PX2 may include a first transistor T1, a second transistor T2, a third transistor T3, a fourth transistor T4, a fifth transistor T5, a sixth transistor T6, a seventh transistor T7, a storage capacitor CST, a hold capacitor CHD, and a light emitting element EL. The first pixel PX1 and the second pixel PX2 may share three transistors. For example, the first pixel PX1 and the second pixel PX2 may share an eighth transistor T8, a ninth transistor T9, and a tenth transistor T10. The gate signal GS may include a first gate signal GW, a second gate signal GI, a third gate signal GC, and a fourth gate signal GB.

In an embodiment, the first pixel PX1 may be a first one of a red pixel, a green pixel, and a blue pixel, and the second pixel PX2 may be a second one of the red pixel, the green pixel, and the blue pixel. For example, the first pixel PX1 may be the red pixel, and the second pixel PX2 may be the green pixel.

The first transistor T1 may include a gate connected to a first node N1, a source connected to a second node N2, and a drain connected to a third node N3. The first transistor T1 may generate a driving current corresponding to a voltage difference between the first node N1 and the second node N2.

The second transistor T2 may include a gate receiving the first gate signal GW, a source receiving the data voltage VDAT, and a drain connected to a fourth node N4. The second transistor T2 may transmit the data voltage VDAT to the fourth node N4 in response to the first gate signal GW.

The third transistor T3 may include a gate receiving the second gate signal GC, a source connected to the third node N3, and a drain connected to the first node N1. The third transistor T3 may connect the third node N3 and the first node N1 in response to the second gate signal GC.

The fourth transistor T4 may include a gate receiving the third gate signal GI, a source receiving a first initialization voltage VINT, and a drain connected to the first node N1. The fourth transistor T4 may transmit the first initialization voltage VINT to the first node N1 in response to the third gate signal GI.

The fifth transistor T5 may include a gate receiving the second gate signal GC, a source receiving a reference voltage VREF, and a drain connected to the fourth node N4. The fifth transistor T5 may transmit the reference voltage VREF to the fourth node N4 in response to the second gate signal GC. In an embodiment, the fifth transistor T5 may receive a first power voltage ELVDD instead of the reference voltage VREF.

The sixth transistor T6 may include a gate receiving the emission signal EM, a source connected to the third node N3, and a drain connected to a fifth node N5. The sixth transistor T6 may connect the third node N3 and the fifth node N5 in response to the emission signal EM.

The seventh transistor T7 may include a gate receiving the fourth gate signal GB, a source receiving a second initialization voltage VAINT, and a drain connected to the fifth node N5. The seventh transistor T7 may transmit the second initialization voltage VAINT to the fifth node N5 in response to the fourth gate signal GB.

The eighth transistor T8 may include a gate receiving the emission signal EM, a source receiving the first power voltage ELVDD, and a drain connected to the second node N2. The eighth transistor T8 may transmit the first power voltage ELVDD to the second node N2 in response to the emission signal EM.

The ninth transistor T9 may include a gate receiving the fourth gate signal GB, a source receiving a bias voltage VBIAS, and a drain connected to the second node N2. The ninth transistor T9 may transmit the bias voltage VBIAS to the second node N2 in response to the fourth gate signal GB.

The tenth transistor T10 may include a gate receiving the second gate signal GC, a source receiving the first power voltage ELVDD, and a drain connected to the second node N2. The tenth transistor T10 may transmit the first power voltage ELVDD to the second node N2 in response to the second gate signal GC.

In an embodiment, each of the first transistor T1 through the tenth transistor T10 may be a P-type transistor (e.g., PMOS transistor). However, embodiments of the present disclosure are not limited thereto, and in another embodiment, at least one of the first transistor T1 through the tenth transistor T10 may be an N-type transistor (e.g., NMOS transistor).

The storage capacitor CST may include a first terminal connected to the first node N1 and a second terminal connected to the fourth node N4. The storage capacitor CST may store a voltage corresponding to a voltage difference between the first node N1 and the fourth node N4.

The hold capacitor CHD may include a first terminal connected to the fourth node N4 and a second terminal receiving the first power voltage ELVDD. The hold capacitor CHD may store a voltage of the fourth node N4.

The light emitting element EL may include a first terminal connected to the fifth node N5 and a second terminal receiving a second power voltage ELVSS. The light emitting element EL may emit light with a luminance corresponding to the driving current generated in the first transistor T1.

In an embodiment, the light emitting element EL may be an organic light emitting diode. However, embodiments of the present disclosure are not limited thereto, and in another embodiment, the light emitting element EL may be any one of an inorganic light emitting diode, a micro light emitting diode, and a quantum dot light emitting diode.

In an embodiment described with reference to FIG. 3, the first pixel PX1 and the second pixel PX2 may share three transistors T8, T9, and T10 connected to the second node N2 (or the sources of the first transistors T1). Accordingly, the sharing of the three transistors T8, T9, and T10 may reduce the number of transistors included in the first pixel PX1 and the second pixel PX2 by three and may increase the resolution of the display device 100.

Figure 4:
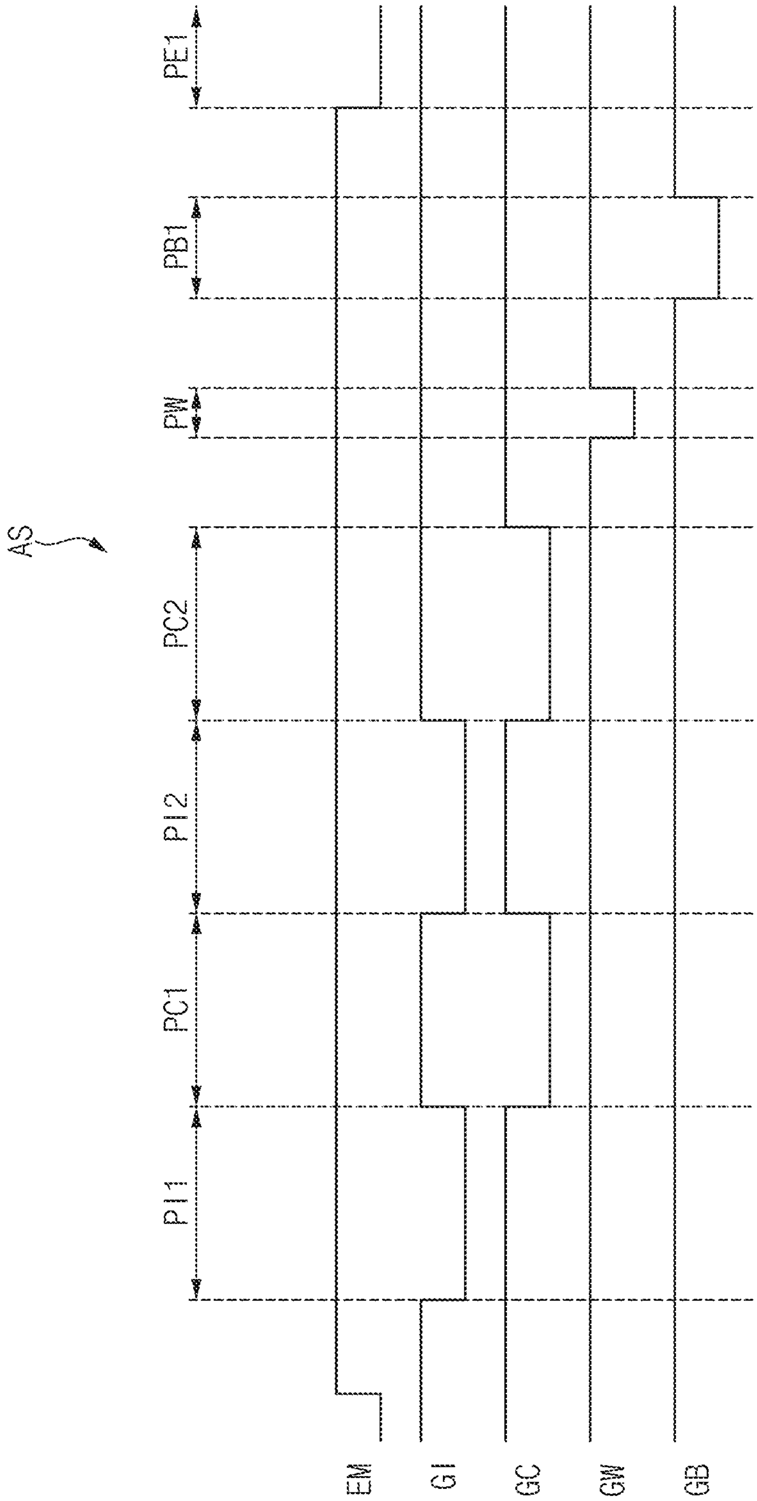
FIGS. 4 to 5 are timing diagrams for describing operations of the first and second pixels of FIG. 3.
Figure 5:
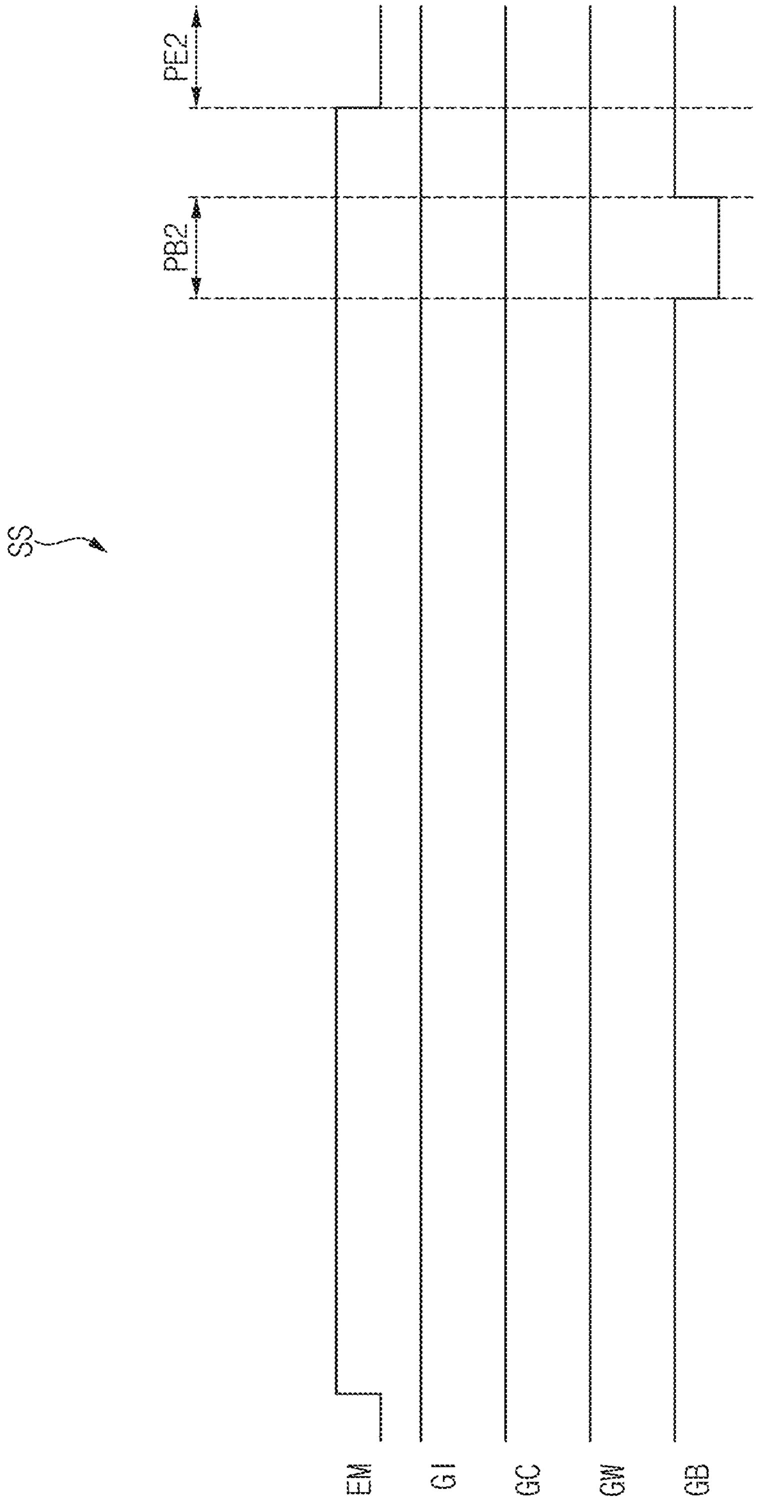

FIGS. 4 to 5 are timing diagrams for describing operations of the first and second pixels PX1 and PX2 of FIG. 3.

Referring to FIGS. 3, 4, and 5, the address scan period AS may include a first initialization period PI1, a first compensation period PC1, a second initialization period PI2, a second compensation period PC2, a writing period PW, a first bypass period PB1, and a first emission period PE1, and the self-scan period SS may include a second bypass period PB2 and a second emission period PE2. The emission signal EM may have a turn-on voltage level (e.g., logic low level) in the first emission period PE1 and the second emission period PE2, and may have a turn-off voltage level (e.g., logic high level) in periods other than the first emission period PE1 and the second emission period PE2.

The third gate signal GI may have a turn-on voltage level in the first initialization period PI1 and the second initialization period PI2. The third gate signal GI may have a turn-off voltage level in periods other than the first initialization period PI1 and the second initialization period PI2. The second gate signal GC may have a turn-on voltage level in the first compensation period PC1 and the second compensation period PC2. The second gate signal GC may have a turn-off voltage level in periods other than the first compensation period PC1 and the second compensation period PC2.

The first gate signal GW may have a turn-on voltage level in the writing period PW. The first gate signal GW may have a turn-off voltage level in periods other than the writing period PW. The fourth gate signal GB may have a turn-on voltage level in the first and second bypass periods PB1 and PB2. The fourth gate signal GB may have a turn-off voltage level in periods other than the first and second bypass periods PB1 and PB2.

The fourth transistor T4 may be turned on in response to the third gate signal GI having the turn-on voltage level in the first initialization period PI1 and may transmit the first initialization voltage VINT to the first node N1. Accordingly, the gate of the first transistor T1 may be initialized to the first initialization voltage VINT. In the first initialization period PI1, the fourth node N4 may be charged with a data voltage of the previous frame period.

The third transistor T3, the fifth transistor T5, and the tenth transistor T10 may be turned on in response to the second gate signal GC having the turn-on voltage level in the first compensation period PC1. A voltage ELVDD−Vth obtained by subtracting a threshold voltage Vth of the first transistor T1 from the first power voltage ELVDD may be transmitted to the first node N1, and the reference voltage VREF may be transmitted to the fourth node N4. A voltage of the fourth node N4 may change from the data voltage of the previous frame period to the reference voltage VREF, and the voltage change of the fourth node N4 may affect a voltage of the first node N1 due to coupling effect of the storage capacitor CST. In the first compensation period PC1, the first node N1 may be charged with a voltage of ELVDD−Vth+$\alpha$ ($\alpha$ is a coupling voltage caused by the voltage change of the fourth node N4).

The fourth transistor T4 may be turned on in response to the third gate signal GI having the turn-on voltage level in the second initialization period PI2 and may transmit the first initialization voltage VINT to the first node N1. Accordingly, the gate of the first transistor T1 may be reinitialized to the first initialization voltage VINT.

The third transistor T3, the fifth transistor T5, and the tenth transistor T10 may be turned on in response to the second gate signal GC having the turn-on voltage level in the second compensation period PC2. A voltage ELVDD−Vth obtained by subtracting the threshold voltage Vth of the first transistor T1 from the first power voltage ELVDD may be transmitted to the first node N1, and the reference voltage VREF may be transmitted to the fourth node N4. The voltage VREF of the fourth node N4 may not change, and a voltage change of the fourth node N4 may not affect the voltage of the first node N1. In the second compensation period PC2, the first node N1 may be charged with a voltage of ELVDD−Vth. Accordingly, the gate of the first transistor T1 may be charged with a voltage ELVDD−Vth in which the threshold voltage Vth of the first transistor T1 is compensated.

The second transistor T2 may be turned on in response to the first gate signal GW having the turn-on voltage level in the write period PW and may transmit the data voltage VDAT to the fourth node N4. The voltage of the fourth node N4 may change from the reference voltage VREF to the data voltage VDAT, and the voltage change VDAT−VREF of the fourth node N4 may be transmitted to the first node N1 due to the coupling effect of the storage capacitor CST. In the write period PW, the first node N1 may be charged with a voltage of ELVDD−Vth+VDAT−VREF.

The seventh transistor T7 and the ninth transistor T9 may be turned on in response to the fourth gate signal GB having the turn-on voltage level in the first bypass period PB1, and the seventh transistor T7 may transmit the second initialization voltage VAINT to the first terminal of the light emitting element EL, and the ninth transistor T9 may transmit the bias voltage VBIAS to the source of the first transistor T1. Accordingly, the first terminal of the light emitting element EL may be initialized to the second initialization voltage VAINT, and the first transistor T1 may be on-biased by the bias voltage VBIAS.

The sixth transistor T6 and the eighth transistor T8 may be turned on in response to the emission signal EM having the turn-on voltage level in the first emission period PE1, and the first transistor T1 may generate the driving current I calculated by Equation 1.

$$I \propto (Vsg - Vth)^2 \quad \text{[Equation 1]}$$

In Equation 1, Vsg may be a source-gate voltage of the first transistor T1. The source-gate voltage Vsg of the first transistor T1 may be a value obtained by subtracting the voltage ELVDD−Vth+VDAT−VREF of the first node N1 from the voltage ELVDD of the second node N2. Accordingly, the driving current I may be calculated by Equation 2.

$$I \propto (VREF - VDAT)^2 \quad \text{[Equation 2]}$$

In the first emission period PE1, the driving current I may flow through the light emitting element EL, and the light emitting element EL may emit light with a luminance corresponding to the data voltage VDAT.

The seventh transistor T7 and the ninth transistor T9 may be turned on in response to the fourth gate signal GB having the turn-on voltage level in the second bypass period PB2, and the seventh transistor T7 may transmit the second initialization voltage VAINT to the first terminal of the light emitting element EL, and the ninth transistor T9 may transmit the bias voltage VBIAS to the source of the first transistor T1. Accordingly, the first terminal of the light emitting element EL may be initialized to the second initialization voltage VAINT, and the first transistor T1 may be on-biased by the bias voltage VBIAS.

The sixth transistor T6 and the eighth transistor T8 may be turned on in response to the emission signal EM having the turn-on voltage level in the second emission period PE2, and the first transistor T1 may generate the driving current I calculated by Equation 1 and Equation 2. In the second emission period PE2, the driving current I may flow through the light emitting element EL, and the light emitting element EL may emit light with a luminance corresponding to the data voltage VDAT.

Figure 6:
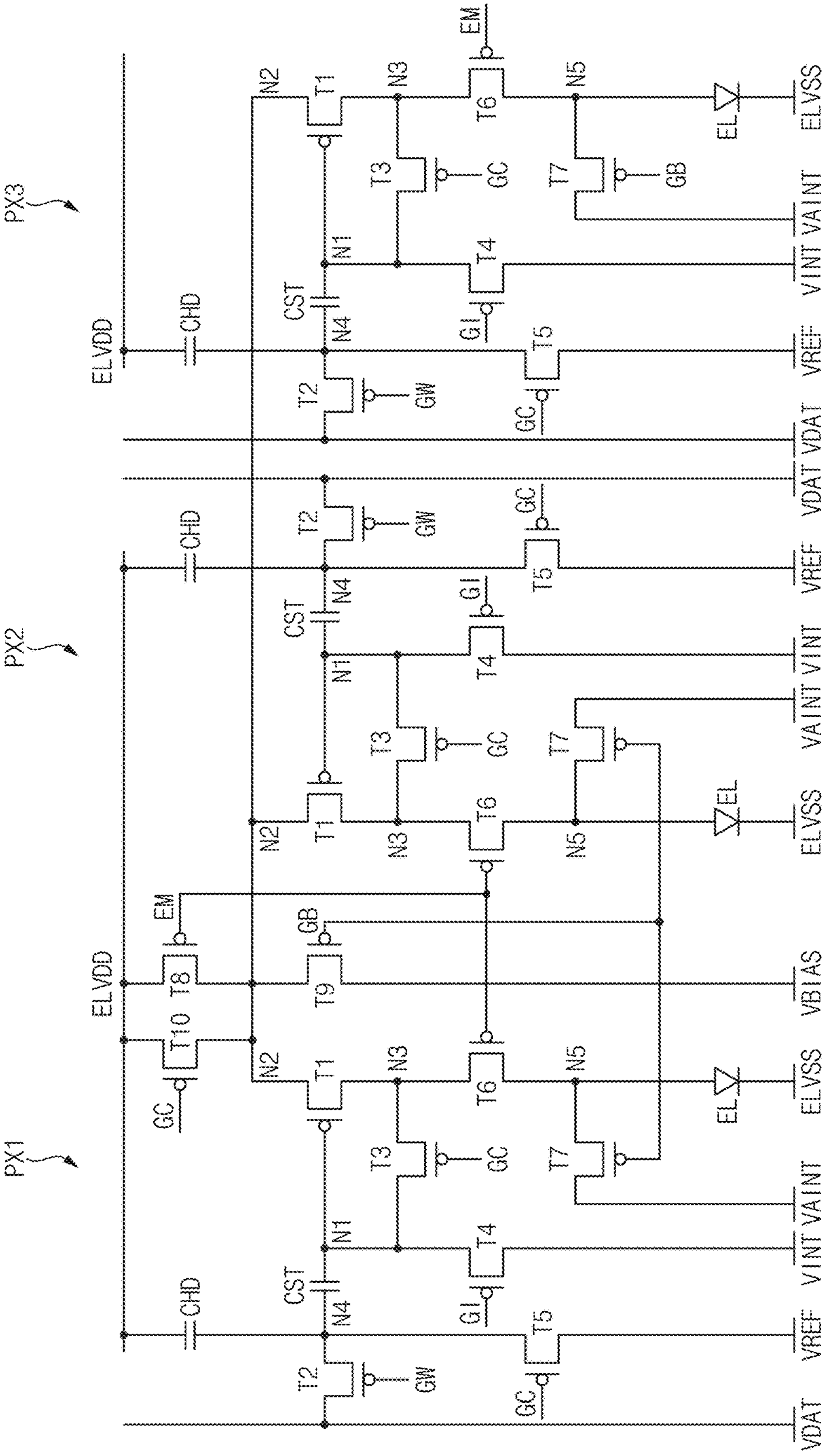
FIG. 6 is a circuit diagram illustrating an example of first to third pixels included in the display device of FIG. 1.
Figure 7:
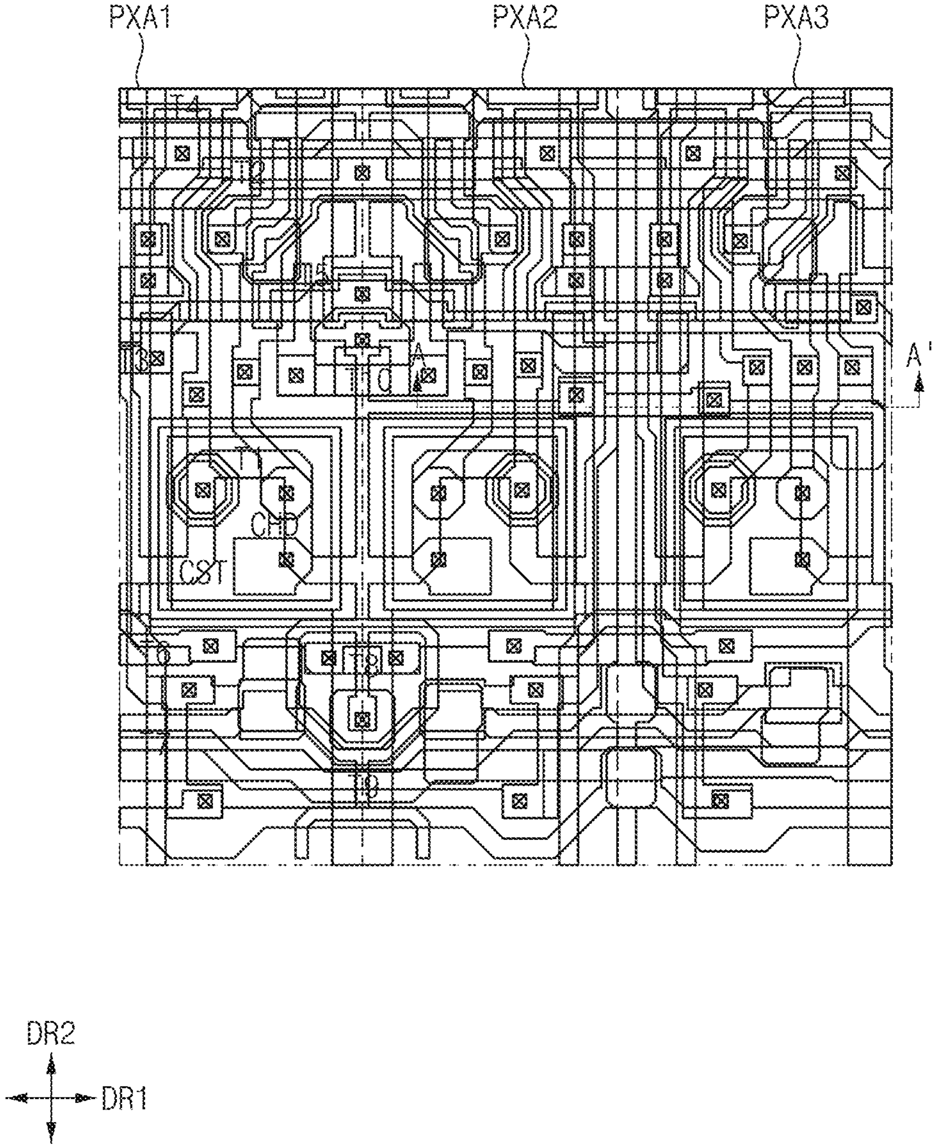
FIGS. 7 to 15 are layout diagrams illustrating first to third pixel areas in which the first to third pixels of FIG. 6 are disposed.
Figure 8:
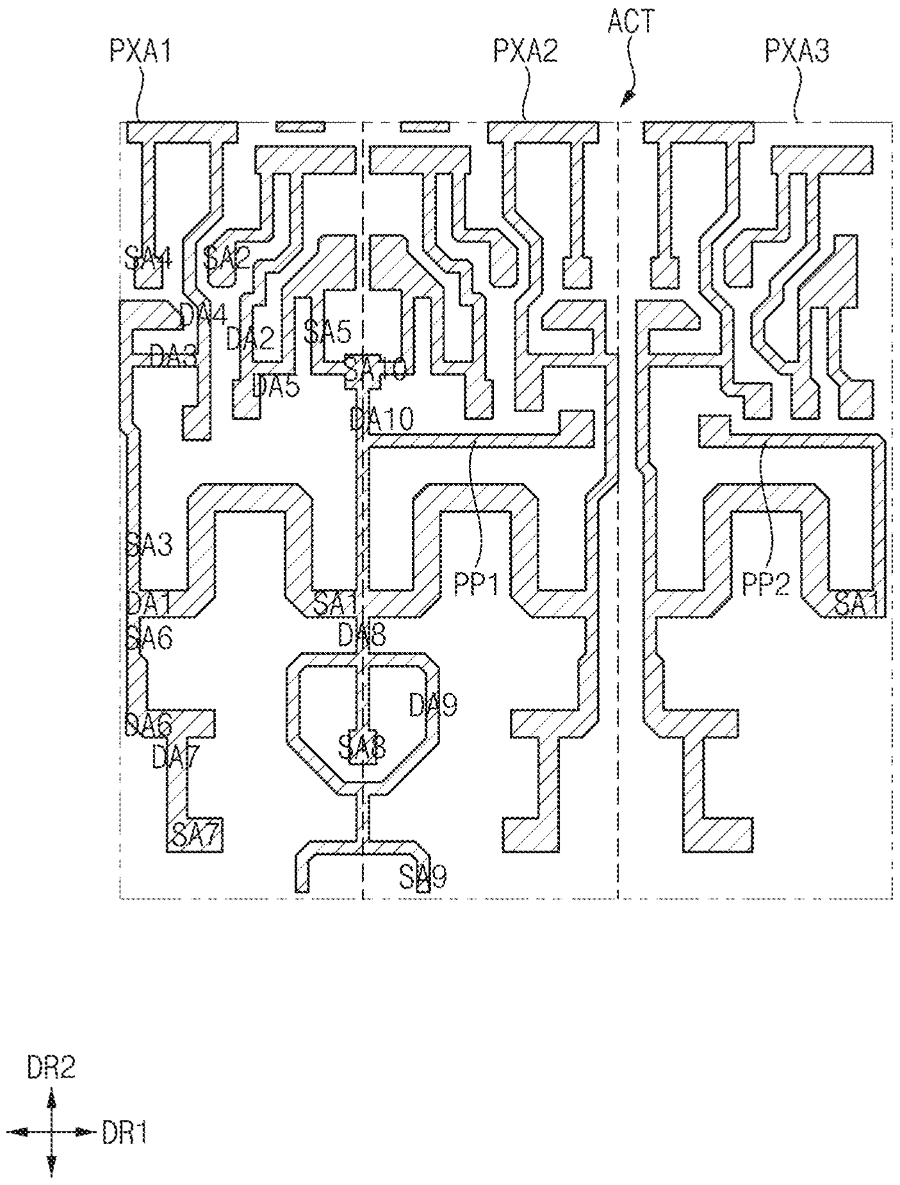
Figure 9:
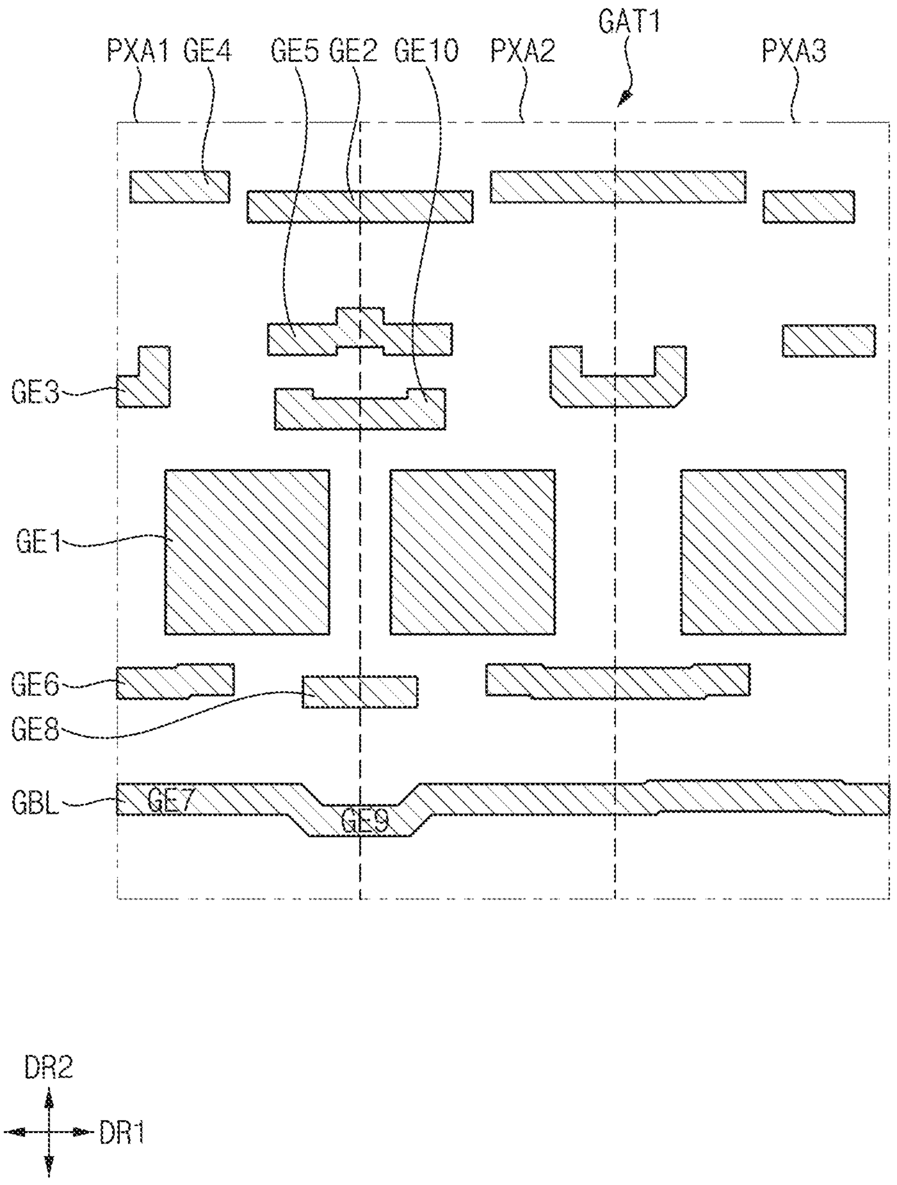
Figure 10:
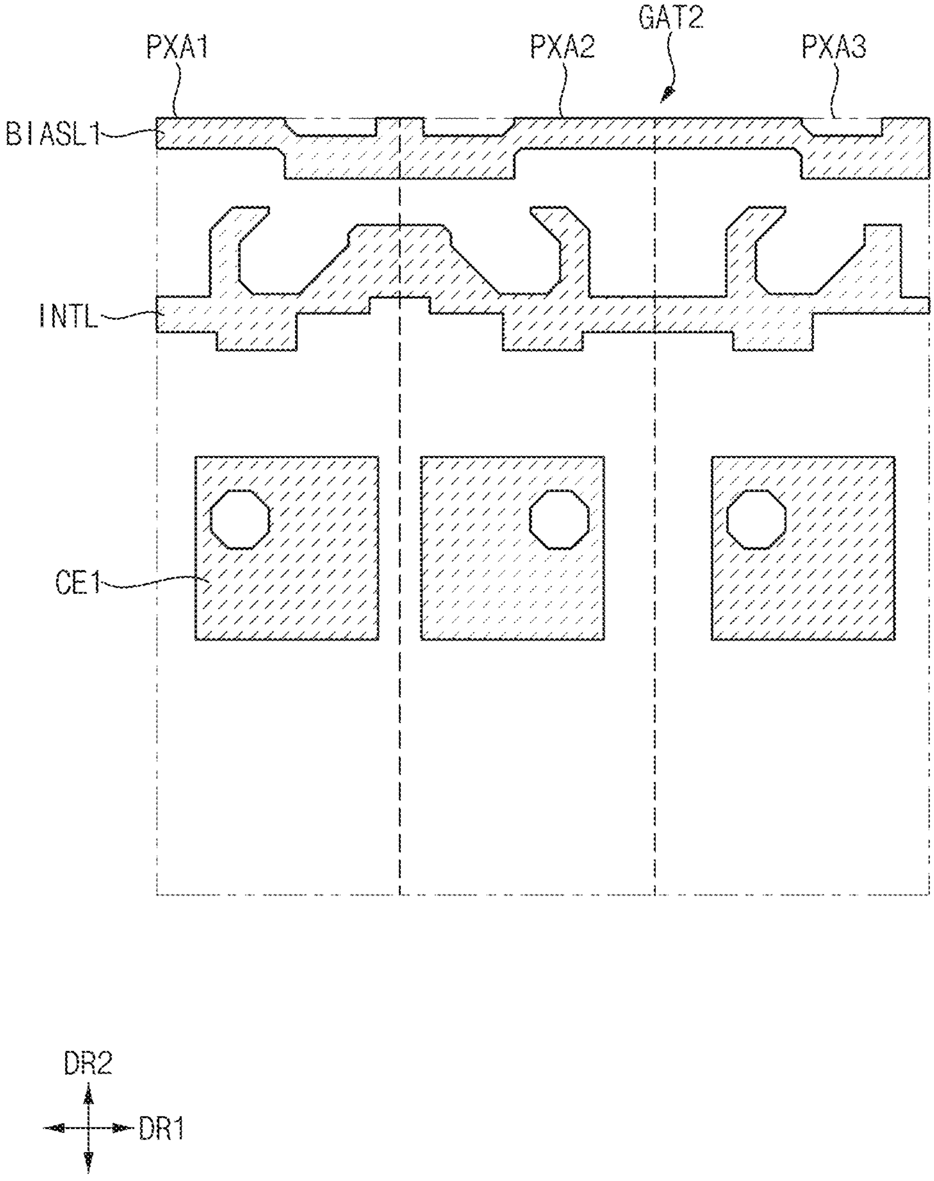
Figure 11:
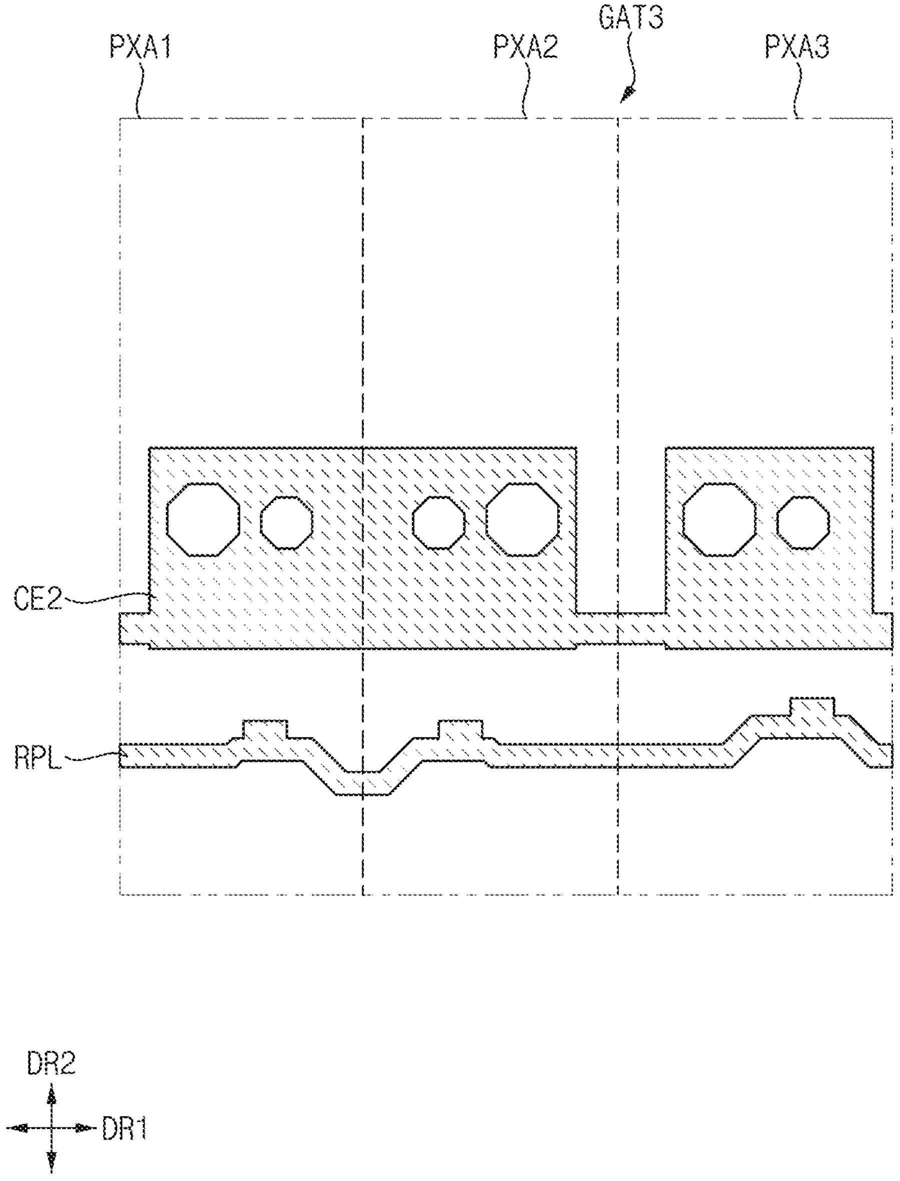
Figure 12:
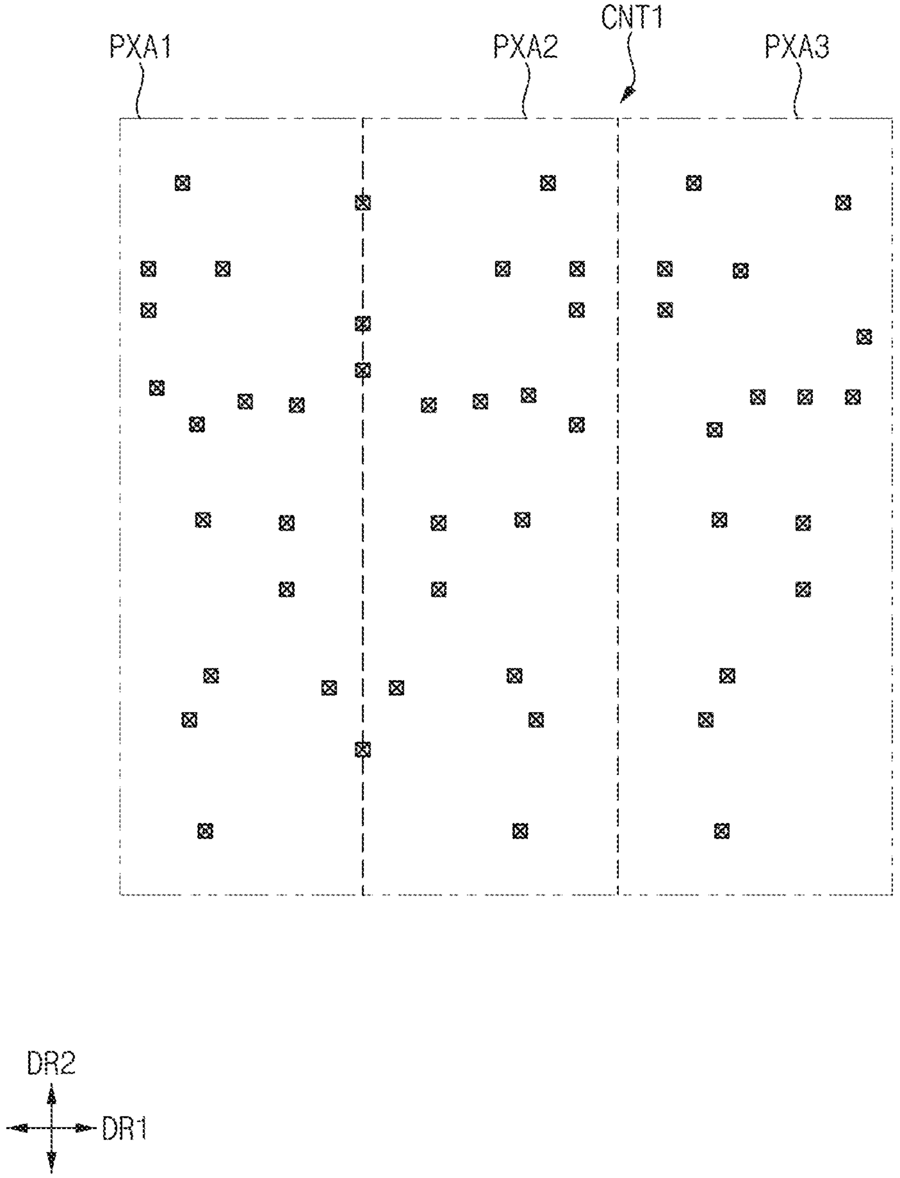
Figure 13:
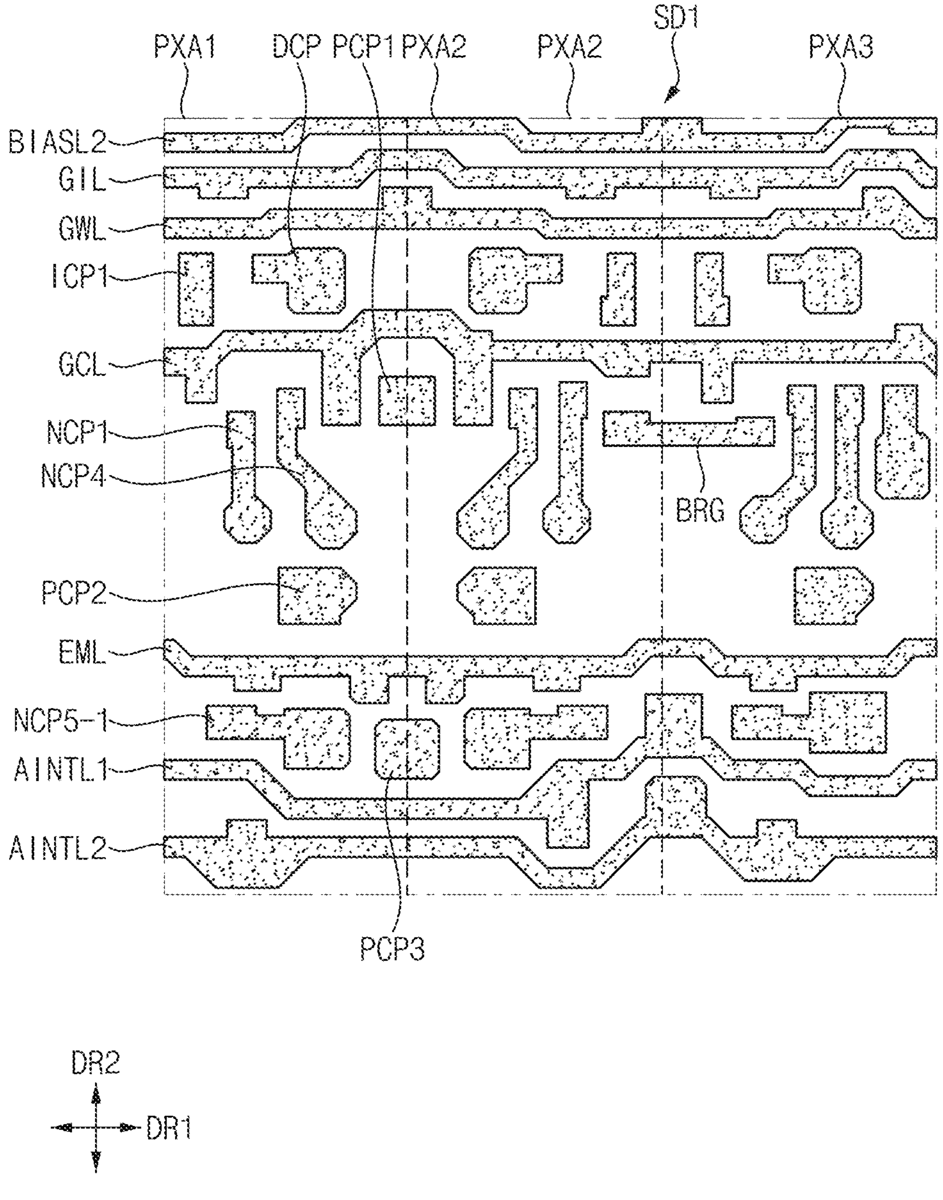
Figure 14:
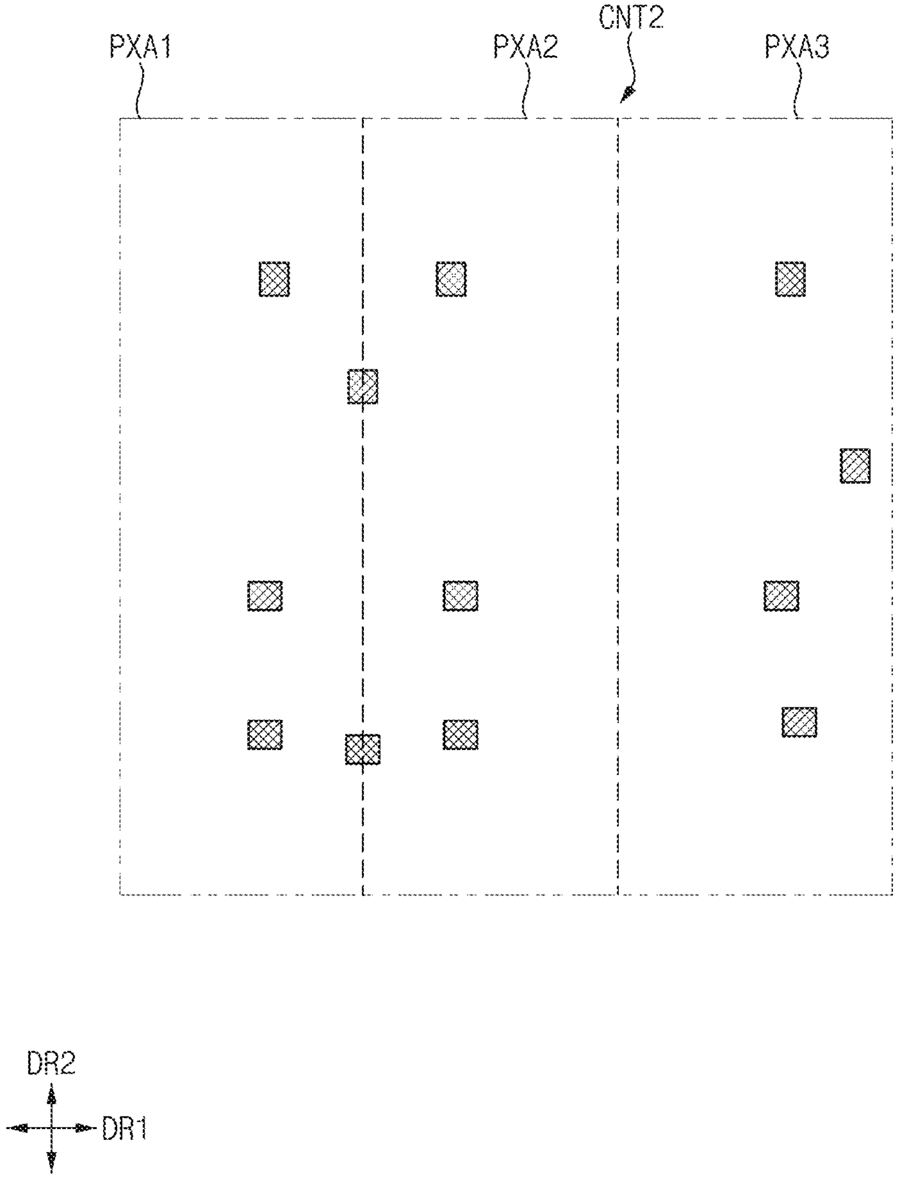
Figure 15:
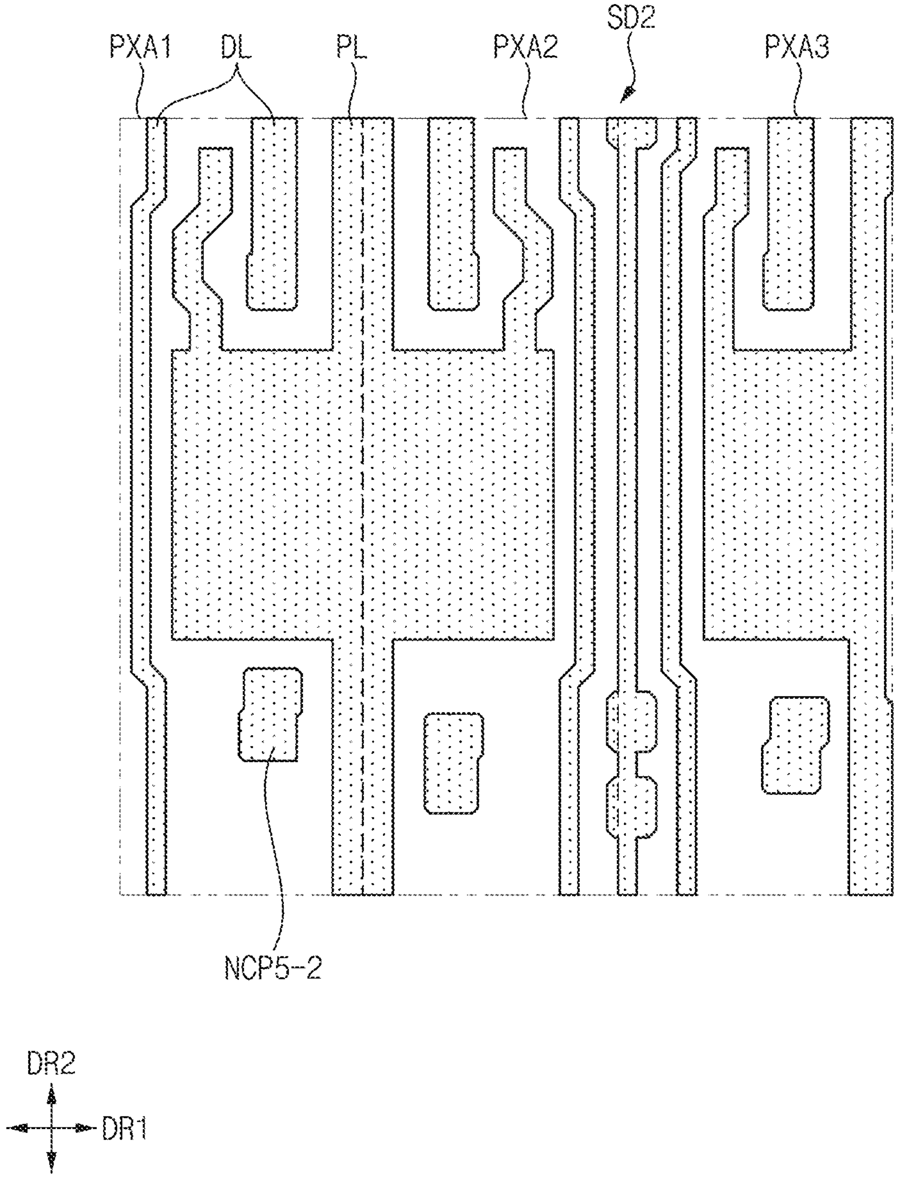

FIG. 6 is a circuit diagram illustrating an example of the first pixel PX1, the second pixel PX2, and the third pixel PX3 included in the display device 100 of FIG. 1.

Descriptions of components of the first pixel PX1, the second pixel PX2, and the third pixel PX3 described with reference to FIG. 6, which are substantially the same as or similar to those of the first and second pixels PX1 and PX2 described with reference to FIG. 3, will be omitted.

Referring to FIGS. 1 and 6, each of the first pixel PX1, the second pixel PX2, and the third pixel PX3 may include the first transistor T1, the second transistor T2, the third transistor T3, the fourth transistor T4, the fifth transistor T5, the sixth transistor T6, the seventh transistor T7, the storage capacitor CST, the hold capacitor CHD, and the light emitting element EL. The first pixel PX1, the second pixel PX2, and the third pixel PX3 may share three transistors. The first pixel PX1, the second pixel PX2, and the third pixel PX3 may share the eighth transistor T8, the ninth transistor T9, and the tenth transistor T10.

Each of the first pixel PX1, the second pixel PX2, and the third pixel PX3 may be a red pixel, a green pixel, or a blue pixel. In an embodiment, the first pixel PX1 may be a first one of a red pixel, a green pixel, and a blue pixel, the second pixel PX2 may be a second one of the red pixel, the green pixel, and the blue pixel, and the third pixel PX3 may be a third one of the red pixel, the green pixel, and the blue pixel. For example, the first pixel PX1 may be a red pixel, the second pixel PX2 may be a green pixel, and the third pixel PX3 may be a blue pixel.

In an embodiment described with reference to FIG. 6, the first pixel PX1, the second pixel PX2, and the third pixel PX3 may share three transistors T8, T9, and T10 connected to the second node N2 (or the sources of the first transistors T1). Accordingly, the number of transistors included in the first pixel PX1, the second pixel PX2, and the third pixel PX3 may decrease by six, and the resolution of the display device 100 may increase.

Figure 16:
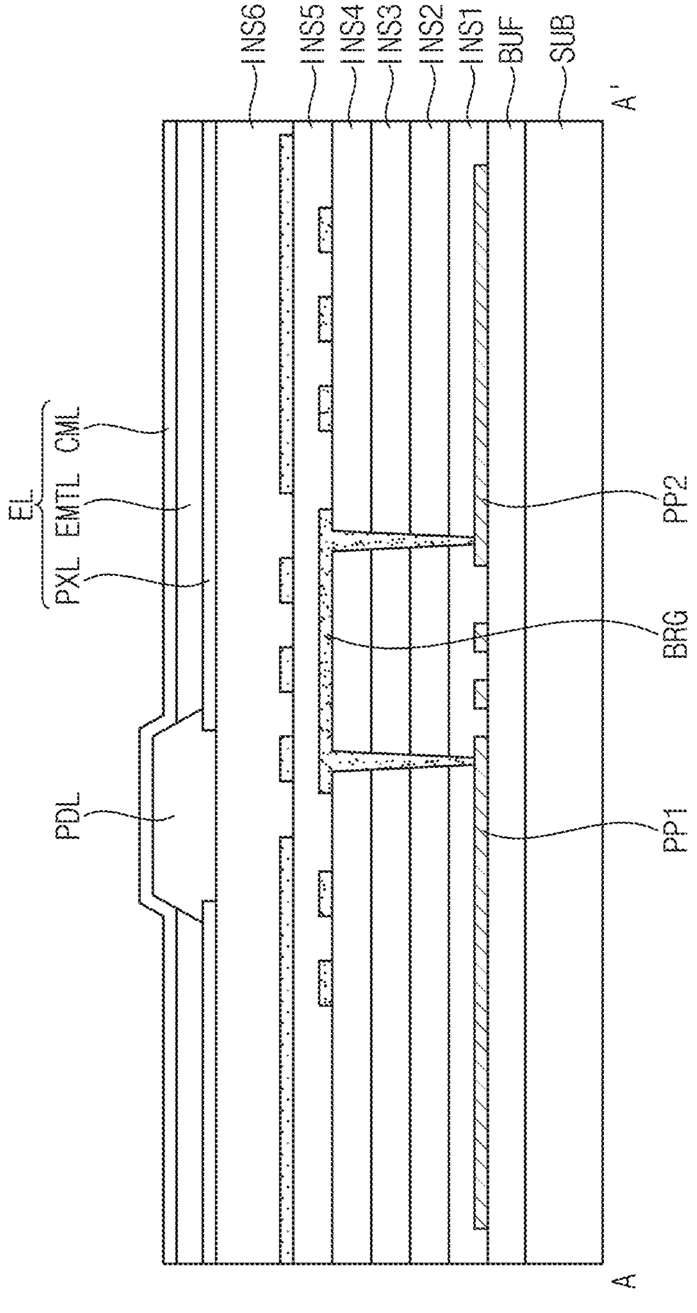
FIG. 16 is a cross-sectional view taken along a line A-A' of FIG. 7.

FIGS. 7 to 15 are layout diagrams illustrating a first pixel area PXA1, a second pixel area PXA2, and a third pixel area PXA3 in which the first pixel PX1, the second pixel PX2, and the third pixel PX3 of FIG. 6 are disposed. FIG. 16 is a cross-sectional view taken along a line A-A' of FIG. 7.

Referring to FIGS. 6 to 16, the first pixel area PXA1, the second pixel area PXA2, and the third pixel area PXA3 may be disposed in the same pixel row and may be adjacent to each other. Each of the first pixel area PXA1, the second pixel area PXA2, and the third pixel area PXA3 may include an active layer ACT, a first conductive layer GAT1, a second conductive layer GAT2, a third conductive layer GAT3, a fourth conductive layer SD1, and a fifth conductive layer SD2.

In an embodiment, a substrate SUB may include glass, plastic, quartz, metal, or the like.

A buffer layer BUF may be disposed on the substrate SUB. In an embodiment, the buffer layer BUF may include an inorganic insulating material.

The active layer ACT may be disposed on the buffer layer BUF. In an embodiment, the active layer ACT may include polycrystalline silicon. However, embodiments of the present disclosure are not limited thereto, and the active layer ACT may include any one of amorphous silicon and oxide semiconductor.

The active layer ACT of each of the first pixel area PXA1, the second pixel area PXA2, and the third pixel area PXA3 may include a first source area SA1, a first drain area DA1, a second source area SA2, a second drain area DA2, a third source area SA3, a third drain area DA3, a fourth source area SA4, a fourth drain area DA4, a fifth source area SA5, a fifth drain area DA5, a sixth source area SA6, a sixth drain area DA6, a seventh source area SA7, and a seventh drain area DA7. The first source area SA1 and the first drain area DA1 may respectively correspond to the source and the drain of the first transistor T1, the second source area SA2 and the second drain area DA2 may respectively correspond to the source and the drain of the transistor T2, the third source area SA3 and the third drain area DA3 may respectively correspond to the source and the drain of the third transistor T3, the fourth source area SA4 and the fourth drain area DA4 may respectively correspond to the source and the drain of the fourth transistor T4, the fifth source area SA5 and the fifth drain area DA5 may respectively correspond to the source and the drain of the fifth transistor T5, the sixth source area SA6 and the sixth drain area DA6 may correspond to the source and the drain of the sixth transistor T6, and the seventh source area SA7 and the seventh drain area DA7 may respectively correspond to the source and the drain of the seventh transistor T7.

The first pixel area PXA1 and the second pixel area PXA2 may share the first source area SA1. In other words, the first source area SA1 of the first pixel area PXA1 and the first source area SA1 of the second pixel area PXA2 may be integrally formed.

The first source area SA1 of the third pixel area PXA3 may be connected to the first source area SA1 shared by the first pixel area PXA1 and the second pixel area PXA2 through a bridge BRG disposed on a layer different from the active layer ACT. Accordingly, the first source area SA1 of the first pixel area PXA1, the first source area SA1 of the second pixel area PXA2, and the first source area SA1 of the third pixel area PXA3 may be electrically connected.

In an embodiment, the first source area SA1 shared by the first pixel area PXA1 and the second pixel area PXA2 may include a first protrusion PP1 extending in the first direction DR1. In an embodiment, the first source area SA1 of the third pixel area PXA3 may include a second protrusion PP2 extending in the first direction DR1.

The active layer ACT of each of the first pixel area PXA1 and the second pixel area PXA2 may include an eighth source area SA8, an eighth drain area DA8, a ninth source area SA9, a ninth drain area DA9, a tenth source area SA10, and a tenth drain area DA10. The eighth source area SA8 and the eighth drain area DA8 may respectively correspond to the source and the drain of the eighth transistor T8, the ninth source area SA9 and the ninth drain area DA9 may respectively correspond to the source and the drain of the ninth transistor T9, and the tenth source area SA10 and the tenth drain area DA10 may respectively correspond to the source and the drain of the tenth transistor T10.

In an embodiment, the first pixel area PXA1 and the second pixel area PXA2 may share the eighth source area SA8, the eighth drain area DA8, the tenth source area SA10, and the tenth drain area DA10. In other words, the eighth source area SA8 of the first pixel area PXA1 and the eighth source area SA8 of the second pixel area PXA2 may be integrally formed, the eighth drain area DA8 of the first pixel area PXA1 and the eighth drain area DA8 of the second pixel area PXA2 may be integrally formed, the tenth source area SA10 of the first pixel area PXA1 and the tenth source area SA10 of the second pixel area PXA2 may be integrally formed, and the tenth drain area DA10 of the first pixel area PXA1 and the tenth drain area DA10 of the second pixel area PXA2 may be integrally formed.

A first insulating layer INS1 may be disposed on the active layer ACT. In an embodiment, the first insulating layer INS1 may include an inorganic insulating material.

The first conductive layer GAT1 may be disposed on the first insulating layer INS1. In an embodiment, the first conductive layer GAT1 may include metal. The first conductive layer GAT1 may include a first gate electrode GE1, a second gate electrode GE2, a third gate electrode GE3, a fourth gate electrode GE4, a fifth gate electrode GE5, a sixth gate electrode GE6, a fourth gate line GBL, an eighth gate electrode GE8, and a tenth gate electrode GE10. The fourth gate line GBL may include a seventh gate electrode GE7 and a ninth gate electrode GE9. The first gate electrode GE1 may correspond to the gate of the first transistor T1 and the first terminal of the storage capacitor CST, the second gate electrode GE2 may correspond to the gate of the second transistor T2, the third gate electrode GE3 may correspond to the gate of the third transistor T3, the fourth gate electrode GE4 may correspond to the gate of the fourth transistor T4, the fifth gate electrode GE5 may correspond to the gate of the fifth transistor T5, the sixth gate electrode GE6 may correspond to the gate of the sixth transistor T6, the seventh gate electrode GE7 may correspond to the gate of the seventh transistor T7, the eighth gate electrode GE8 may correspond to the gate of the eighth transistor T8, the ninth gate electrode GE9 may correspond to the gate of the ninth transistor T9, and the tenth gate electrode GE10 may correspond to the gate of the tenth transistor T10.

In a plan view, the first gate electrode GE1 may be positioned between the first source area SA1 and the first drain area DA1, the second gate electrode GE2 may be positioned between the second source area SA2 and the second drain area DA2, the third gate electrode GE3 may be positioned between the third source area SA3 and the third drain area DA3, the fourth gate electrode GE4 may be positioned between the fourth source area SA4 and the fourth drain area DA4, the fifth gate electrode GE5 may be positioned between the fifth source area SA5 and the fifth drain area DA5, the sixth gate electrode GE6 may be positioned between the sixth source area SA6 and the sixth drain area DA6, the seventh gate electrode GE7 may be positioned between the seventh source area SA7 and the seventh drain area DA7, the eighth gate electrode GE8 may be positioned between the eighth source area SA8 and the eighth drain area DA8, the ninth gate electrode GE9 may be positioned between the ninth source area SA9 and the ninth drain area DA9, and the tenth gate electrode GE10 may be positioned between the tenth source area SA10 and the tenth drain area DA10.

The fourth gate line GBL may extend in the first direction DR1. The fourth gate line GBL may transmit the fourth gate signal GB.

A second insulating layer INS2 may be disposed on the first conductive layer GAT1.

In an embodiment, the second insulating layer INS2 may include an inorganic insulating material.

The second conductive layer GAT2 may be disposed on the second insulating layer INS2. In an embodiment, the second conductive layer GAT2 may include metal. The second conductive layer GAT2 may include a first capacitor electrode CE1, a first initialization line INTL, and a first bias line BIASL1.

The first capacitor electrode CE1 may overlap the first gate electrode GE1. The first capacitor electrode CE1 may correspond to the second terminal of the storage capacitor CST and the first terminal of the hold capacitor CHD.

The first initialization line INTL may extend in the first direction DR1. The first initialization line INTL may transmit the first initialization voltage VINT. The first bias line BIASL1 may extend in the first direction DR1. The first bias line BIASL1 may transmit the bias voltage VBIAS.

A third insulating layer INS3 may be disposed on the second conductive layer GAT2. In an embodiment, the third insulating layer INS3 may include an inorganic insulating material.

The third conductive layer GAT3 may be disposed on the third insulating layer INS3. In an embodiment, the third conductive layer GAT3 may include metal. The third conductive layer GAT3 may include a second capacitor electrode CE2 and a repair line RPL.

The second capacitor electrode CE2 may overlap the first capacitor electrode CE1. The second capacitor electrode CE2 may correspond to the second terminal of the hold capacitor CHD. The second capacitor electrode CE2 may extend in the first direction DR1.

The repair line RPL may extend in the first direction DR1.

A fourth insulating layer INS4 may be disposed on the third conductive layer GAT3. In an embodiment, the fourth insulating layer INS4 may include an inorganic insulating material and/or an organic insulating material.

The fourth conductive layer SD1 may be disposed on the fourth insulating layer INS4. In an embodiment, the fourth conductive layer SD1 may include metal. The fourth conductive layer SD1 may include a second bias line BIASL2, a third gate line GIL, a first gate line GWL, a first initialization connection pattern ICP1, a data connection pattern DCP, a second gate line GCL, a first power connection pattern PCP1, a first node connection pattern NCP1, a fourth node connection pattern NCP4, a second power connection pattern PCP2, an emission line EML, a 5-1$^{st}$ node connection pattern NCP5-1, a third power connection pattern PCP3, a 2-1$^{st}$ initialization line AINTL1, a 2-2$^{nd}$ initialization line AINTL2, and the bridge BRG.

The second bias line BIASL2 may extend in the first direction DR1. The second bias line BIASL2 may transmit the bias voltage VBIAS. The second bias line BIASL2 may be connected to the ninth source area SA9 and the first bias line BIASL1 through first contact holes CNT1.

The third gate line GIL may extend in the first direction DR1. The third gate line GIL may transmit the third gate signal GI. The third gate line GIL may be connected to the fourth gate electrode GE4 through a first contact hole CNT1.

The first gate line GWL may extend in the first direction DR1. The first gate line GWL may transmit the first gate signal GW. The first gate line GWL may be connected to the second gate electrode GE2 through a first contact hole CNT1.

The first initialization connection pattern ICP1 may be connected to the fourth source area SA4 and the first initialization line INTL through first contact holes CNT1. The data connection pattern DCP may be connected to the second source area SA2 through a first contact hole CNT1.

The second gate line GCL may extend in the first direction DR1. The second gate line GCL may transmit the second gate signal GC. The second gate line GCL may be connected to the third gate electrode GE3, the fifth gate electrode GE5, and the tenth gate electrode GE10 through first contact holes CNT1.

The first power connection pattern PCP1 may be connected to the fifth source area SA5 and the tenth source area SA10 through first contact holes CNT1. The first node connection pattern NCP1 may be connected to the third drain area DA3, the fourth drain area DA4, and the first gate electrode GE1 through first contact holes CNT1. In this case, the first power voltage ELVDD may be transmitted to the fifth source area SA5 instead of the reference voltage VREF. In other words, the source of the fifth transistor T5 may receive the first power voltage ELVDD instead of the reference voltage VREF.

The fourth node connection pattern NCP4 may be connected to the second drain area DA2, the fifth drain area DA5, and the first capacitor electrode CE1 through first contact holes CNT1. The second power connection pattern PCP2 may be connected to the second capacitor electrode CE2 through a first contact hole CNT1.

The emission line EML may extend in the first direction DR1. The emission line EML may transmit the emission signal EM. The emission line EML may be connected to the sixth gate electrode GE6 and the eighth gate electrode GE8 through first contact holes CNT1.

The 5-1$^{st}$ node connection pattern NCP5-1 may be connected to the sixth drain area DA6 and the seventh drain area DA7 through first contact holes CNT1. The third power connection pattern PCP3 may be connected to the eighth source area SA8 through a first contact hole CNT1.

The 2-1$^{st}$ initialization line AINTL1 may extend in the first direction DR1. The 2-1$^{st}$ initialization line AINTL1 may transmit the second initialization voltage VAINT for the second pixel PX2. The 2-1$^{st}$ initialization line AINTL1 may be connected to the seventh source area SA7 of the second pixel area PXA2 through a first contact hole CNT1.

The 2-2$^{nd}$ initialization line AINTL2 may extend in the first direction DR1. The 2-2$^{nd}$ initialization line AINTL2 may transmit the second initialization voltage VAINT for the first and third pixels PX1 and PX3. The 2-2$^{nd}$ initialization line AINTL2 may be connected to the seventh source area SA7 of the first pixel area PXA1 and the seventh source area SA7 of the third pixel area PXA3 through first contact holes CNT1.

The bridge BRG may be connected to the first protrusion PP1 and the second protrusion PP2 through first contact holes CNT1. Specifically, a first end (also referred to herein as a first end portion) of the bridge BRG may be connected to the first protrusion PP1 through the first contact hole CNT1, and a second end (also referred to herein as a second end portion) of the bridge BRG may be connected to the second protrusion PP2 through the first contact hole CNT1.

A fifth insulating layer INS5 may be disposed on the fourth conductive layer SD1. In an embodiment, the fifth insulating layer INS5 may include an inorganic insulating material and/or an organic insulating material.

The fifth conductive layer SD2 may be disposed on the fifth insulating layer INS5. In an embodiment, the fifth conductive layer SD2 may include metal. The fifth conductive layer SD2 may include a data line DL, a power line PL, and a 5-2$^{nd}$ node connection pattern NCP5-2.

The data line DL may extend in a second direction (or pixel column direction) DR2. The data line DL may transmit the data voltage VDAT. The data line DL may be connected to the data connection pattern DCP through a second contact hole CNT2.

The power line PL may extend in the second direction DR2. The power line PL may transmit the first power voltage ELVDD. The power line PL may be connected to the first power connection pattern PCP1, the second power connection pattern PCP2, and the third power connection pattern PCP3 through second contact holes CNT2.

The 5-2$^{nd}$ node connection pattern NCP5-2 may be connected to the 5-1$^{st}$ node connection pattern NCP5-1 through a second contact hole CNT2.

A sixth insulating layer INS6 may be disposed on the fifth conductive layer SD2. In an embodiment, the sixth insulating layer INS6 may include an inorganic insulating material and/or an organic insulating material.

A first electrode layer PXL may be disposed on the sixth insulating layer INS6. In an embodiment, the first electrode layer PXL may include metal and/or transparent conductive oxide. The first electrode layer PXL may correspond to the first terminal of the light emitting element EL.

A pixel defining layer PDL may be disposed on the sixth insulating layer INS6 and may cover a periphery (or edge) of the first electrode layer PXL. In an embodiment, the pixel defining layer PDL may include an inorganic insulating material and/or an organic insulating material.

A light emitting layer EMTL may be disposed on a center of the first electrode layer PXL which is not covered by the pixel defining layer PDL. In an embodiment, the light emitting layer EMTL may include an organic light emitting material.

A second electrode layer CML may be disposed on the light emitting layer EMTL and the pixel defining layer PDL. In an embodiment, the second electrode layer CML may include metal and/or transparent conductive oxide. The second electrode layer CML may correspond to the second terminal of the light emitting element EL.

A shape of the first pixel area PXA1 and a shape of the second pixel area PX2 may be symmetrical to each other with respect to an imaginary line IML extending in the second direction DR2 between the first pixel area PXA1 and the second pixel area PXA2. Specifically, a shape of the active layer ACT of the first pixel area PXA1 and a shape of the active layer ACT of the second pixel area PXA2 may be symmetrical to each other with respect to the imaginary line IML, a shape of the first conductive layer GAT1 of the first pixel area PXA1 and a shape of the first conductive layer GAT1 of the second pixel area PXA2 may be symmetrical to each other with respect to the imaginary line IML, a shape of the second conductive layer GAT2 of the first pixel area PXA1 and a shape of the second conductive layer GAT2 of the second pixel area PXA2 may be symmetrical to each other with respect to the imaginary line IML, a shape of the third conductive layer GAT3 of the first pixel area PXA1 and a shape of the third conductive layer GAT3 of the second pixel area PXA2 may be symmetrical to each other with respect to the imaginary line IML, a shape of the fourth conductive layer SD1 of the first pixel area PXA1 and a shape of the fourth conductive layer SD1 of the second pixel area PXA2 may be symmetrical to each other with respect to the imaginary line IML, and a shape of the fifth conductive layer SD2 of the first pixel area PXA1 and a shape of the fifth conductive layer SD2 of the second pixel area PXA2 may be symmetrical to each other with respect to the imaginary line IML.

The first pixel area PXA1 and the third pixel area PX3 may have substantially the same shape. Specifically, the active layer ACT of the first pixel area PXA1 and the active layer ACT of the third pixel area PX3 may have substantially the same shape, the first conductive layer GAT1 of the first pixel area PXA1 and the first conductive layer GAT1 of the third pixel area PX3 may have substantially the same shape, the second conductive layer GAT2 of the first pixel area PXA1 and the second conductive layer GAT2 of the third pixel area PX3 may have substantially the same shape, the third conductive layer GAT3 of the first pixel area PXA1 and the third conductive layer GAT3 of the third pixel area PX3 may have substantially the same shape, the fourth conductive layer SD1 of the first pixel area PXA1 and the fourth conductive layer SD1 of the third pixel area PX3 may have substantially the same shape, and the fifth conductive layer SD2 of the first pixel area PXA1 and the fifth conductive layer SD2 of the third pixel area PX3 may have substantially the same shape.

Figure 17:
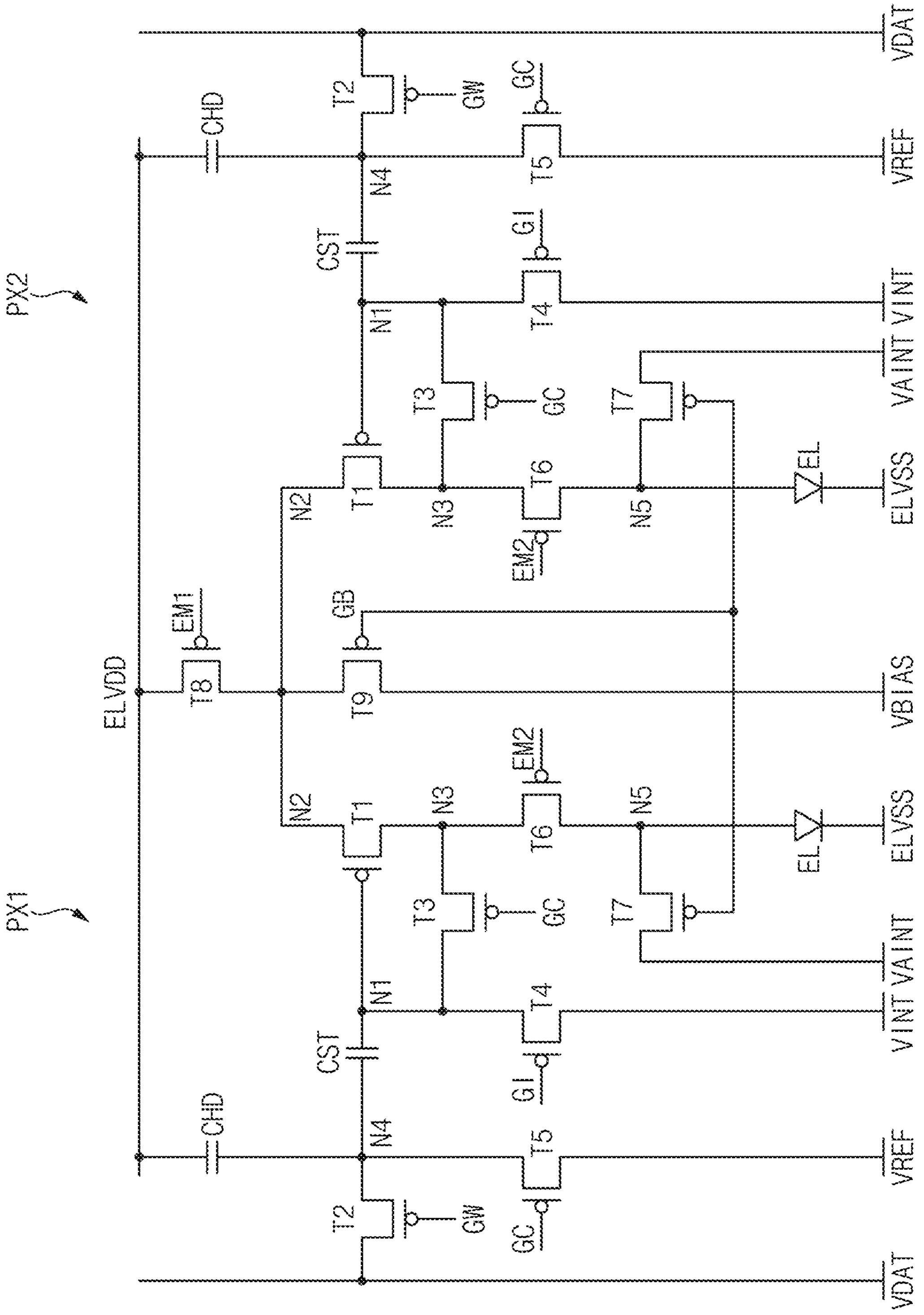
FIG. 17 is a circuit diagram illustrating an example of first and second pixels included in the display device of FIG. 1.

FIG. 17 is a circuit diagram illustrating an example of the first and second pixels PX1 and PX2 included in the display device 100 of FIG. 1.

Descriptions of components of the first and second pixels PX1 and PX2 described with reference to FIG. 17, which are substantially the same as or similar to those of the first and second pixels PX1 and PX2 described with reference to FIG. 3, will be omitted.

Referring to FIGS. 1 and 17, each of the first pixel PX1 and the second pixel PX2 may include the first transistor T1, the second transistor T2, the third transistor T3, the fourth transistor T4, the fifth transistor T5, the sixth transistor T6, the seventh transistor T7, the storage capacitor CST, the hold capacitor CHD, and the light emitting element EL. The first pixel PX1 and the second pixel PX2 may share two transistors. The first pixel PX1 and the second pixel PX2 may share the eighth transistor T8 and the ninth transistor T9. The emission signal EM may include a first emission signal EM1 and a second emission signal EM2.

The sixth transistor T6 may include a gate receiving the second emission signal EM2, a source connected to the third node N3, and a drain connected to the fifth node N5. The sixth transistor T6 may connect the third node N3 and the fifth node N5 in response to the second emission signal EM2.

The eighth transistor T8 may include a gate receiving the first emission signal EM1, a source receiving the first power voltage ELVDD, and a drain connected to the second node N2. The eighth transistor T8 may transmit the first power voltage ELVDD to the second node N2 in response to the first emission signal EM1.

In an embodiment described with reference to FIG. 17, the first pixel PX1 and the second pixel PX2 may share two transistors T8 and T9 connected to the second node N2 (or the sources of the first transistors T1). Accordingly, the number of transistors included in the first pixel PX1 and the second pixel PX2 may decrease by two, and the resolution of the display device 100 may increase.

Figure 18:
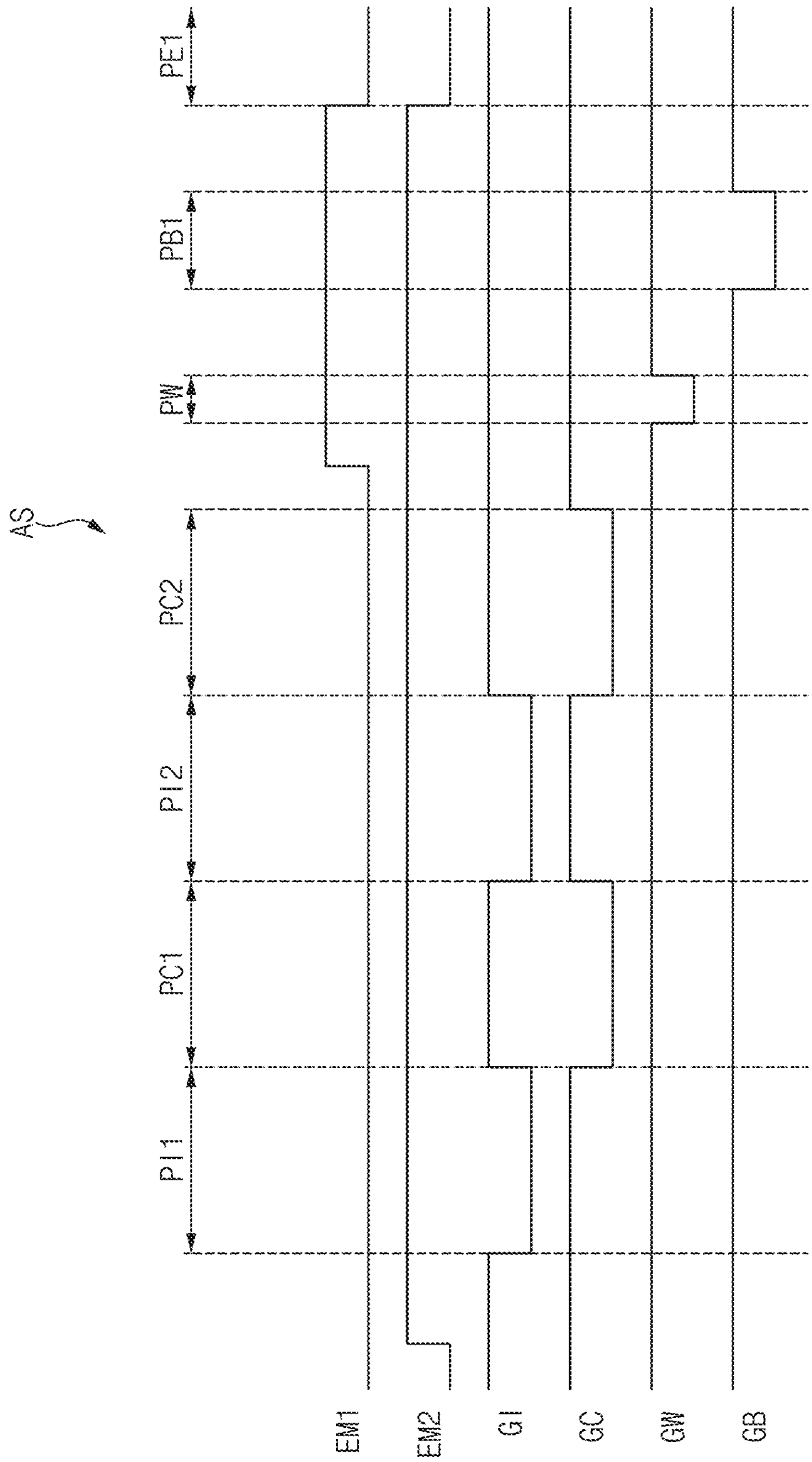
FIGS. 18 to 19 are timing diagrams for describing operations of the first and second pixels of FIG. 17.
Figure 19:
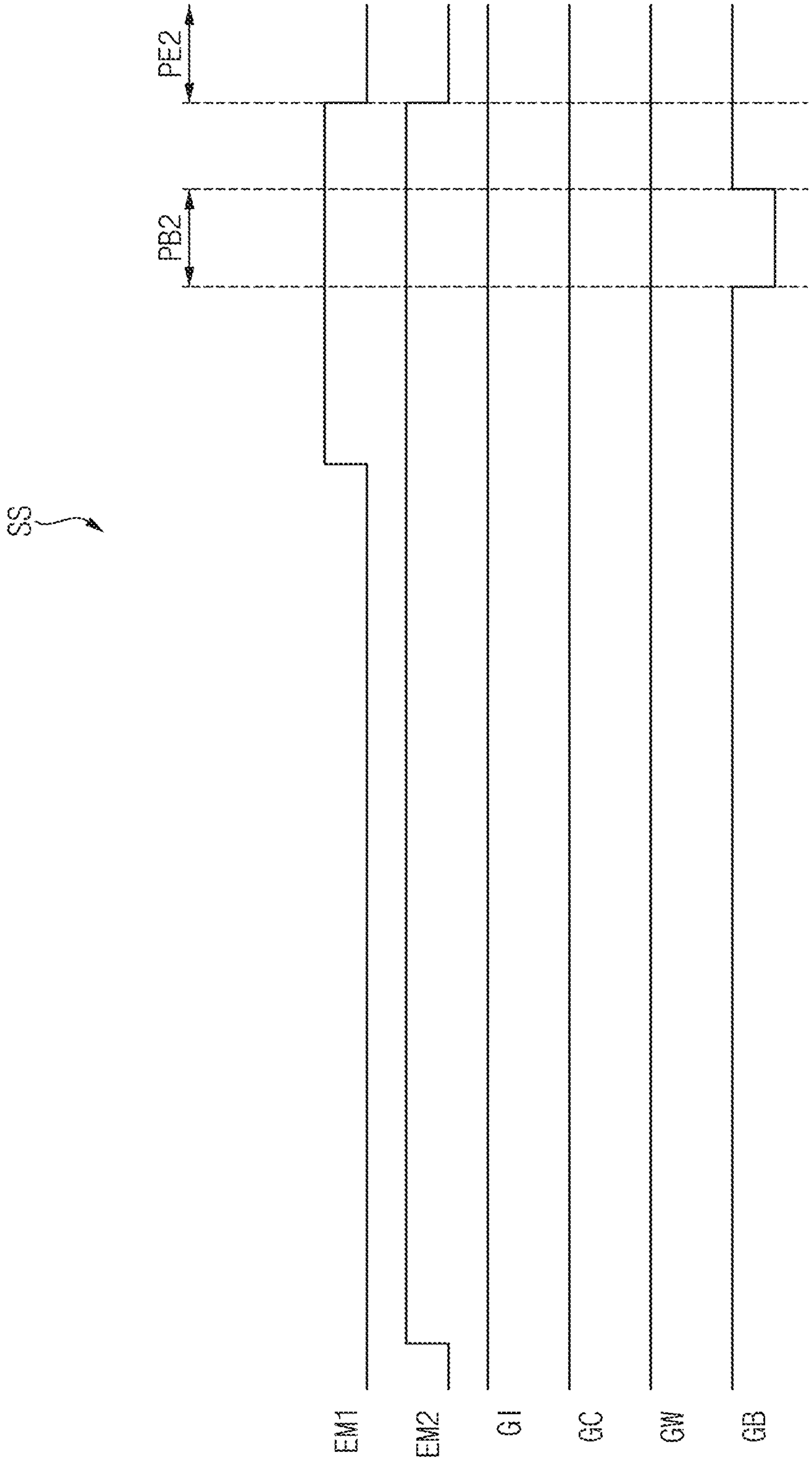

FIGS. 18 to 19 are timing diagrams for describing operations of the first and second pixels PX1 and PX2 of FIG. 17.

Descriptions of periods of the operation of the first and second pixels PX1 and PX2 described with reference to FIGS. 18 and 19, which are substantially the same as or similar to those of the operation of the first and second pixels PX1 and PX2 described with reference to FIGS. 4 and 5, will be omitted.

Referring to FIGS. 17, 18, and 19, the first emission signal EM1 may have a turn-on voltage level in the first and second initialization periods PI1 and PI2, the first and second compensation periods PC1 and PC2, and the first emission period PE1 and the second emission period PE2, and the first emission signal EM1 may have a turn-off voltage level in the writing period PW and first and second bypass periods PB1 and PB2. The second emission signal EM2 may have a turn-on voltage level in the first emission period PE1 and the second emission period PE2. The second emission signal EM2 may have a turn-off voltage level in periods other than the first emission period PE1 and the second emission period PE2.

The third transistor T3, the fifth transistor T5, and the eighth transistor T8 may be turned on in response to the second gate signal GC and the first emission signal EM1 having the turn-on voltage level in the first compensation period PC1. A voltage ELVDD−Vth obtained by subtracting a threshold voltage Vth of the first transistor T1 from the first power voltage ELVDD may be transmitted to the first node N1, and the reference voltage VREF may be transmitted to the fourth node N4. A voltage of the fourth node N4 may change from the data voltage of the previous frame period to the reference voltage VREF, and the voltage change of the fourth node N4 may affect a voltage of the first node N1 due to coupling effect of the storage capacitor CST. In the first compensation period PC1, the first node N1 may be charged with a voltage of ELVDD−Vth+α (α is a coupling voltage caused by the voltage change of the fourth node N4).

The third transistor T3, the fifth transistor T5, and the eighth transistor T8 may be turned on in response to the second gate signal GC and the first emission signal EM1 having the turn-on voltage level in the second compensation period PC2. A voltage ELVDD−Vth obtained by subtracting the threshold voltage Vth of the first transistor T1 from the first power voltage ELVDD may be transmitted to the first node N1, and the reference voltage VREF may be transmitted to the fourth node N4. The voltage VREF of the fourth node N4 may not change, and a voltage change of the fourth node N4 may not affect the voltage of the first node N1. In the second compensation period PC2, the first node N1 may be charged with a voltage of ELVDD−Vth. Accordingly, the gate of the first transistor T1 may be charged with a voltage ELVDD−Vth in which the threshold voltage Vth of the first transistor T1 is compensated.

The sixth transistor T6 and the eighth transistor T8 may be turned on in response to the first emission signal EM1 and the second emission signal EM2 having the turn-on voltage level in the first emission period PE1, and the first transistor T1 may generate the driving current I calculated by Equation 1 and Equation 2. In the first emission period PE1, the driving current I may flow through the light emitting element EL, and the light emitting element EL may emit light with a luminance corresponding to the data voltage VDAT. The sixth transistor T6 and the eighth transistor T8 may be turned on in response to the first emission signal EM1 and the second emission signal EM2 having the turn-on voltage level in the second emission period PE2, and the first transistor T1 may generate the driving current I calculated by Equation 1 and Equation 2. In the second emission period PE2, the driving current I may flow through the light emitting element EL, and the light emitting element EL may emit light with a luminance corresponding to the data voltage VDAT.

Figure 20:
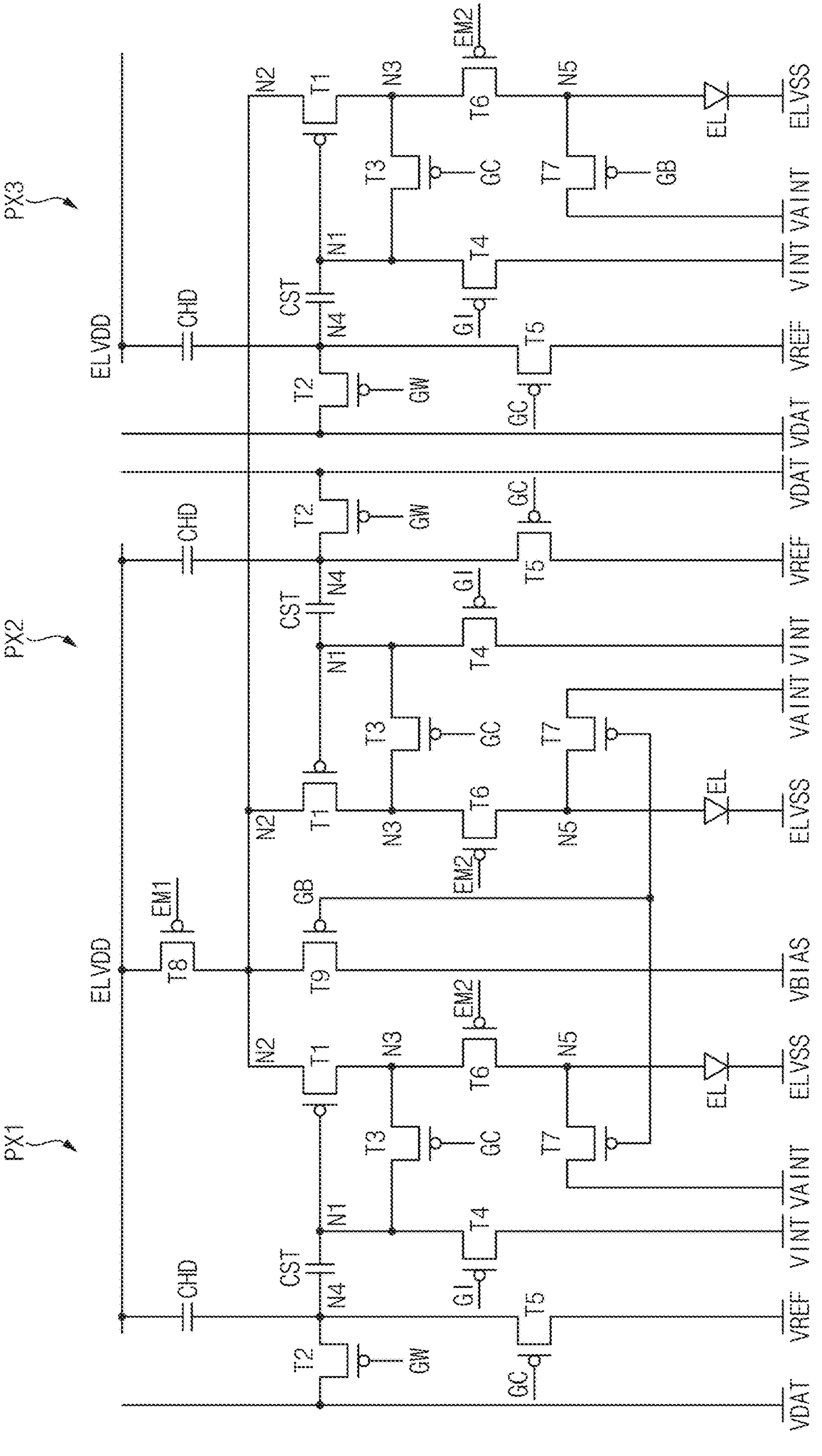
FIG. 20 is a circuit diagram illustrating an example of first to third pixels included in the display device of FIG. 1.

FIG. 20 is a circuit diagram illustrating an example of the first pixel PX1, the second pixel PX2, and the third pixel PX3 included in the display device 100 of FIG. 1.

Descriptions of components of the first to third pixels PX1, PX2, PX3 described with reference to FIG. 20, which are substantially the same as or similar to those of the first and second pixels PX1 and PX2 described with reference to FIG. 17, will be omitted.

Referring to FIGS. 1 and 20, each of the first pixel PX1, the second pixel PX2, and the third pixel PX3 may include the first transistor T1, the second transistor T2, the third transistor T3, the fourth transistor T4, the fifth transistor T5, the sixth transistor T6, the seventh transistor T7, the storage capacitor CST, the hold capacitor CHD, and the light emitting element EL. The first pixel PX1, the second pixel PX2, and the third pixel PX3 may share two transistors. The first pixel PX1, the second pixel PX2, and the third pixel PX3 may share the eighth transistor T8 and the ninth transistor T9.

In an embodiment described with reference to FIG. 20, the first pixel PX1, the second pixel PX2, and the third pixel PX3 may share two transistors T8 and T9 connected to the second node N2 (or the sources of the first transistors T1). Accordingly, the number of transistors included in the first pixel PX1, the second pixel PX2, and the third pixel PX3 may decrease by four, and the resolution of the display device 100 may increase.

Figure 21:
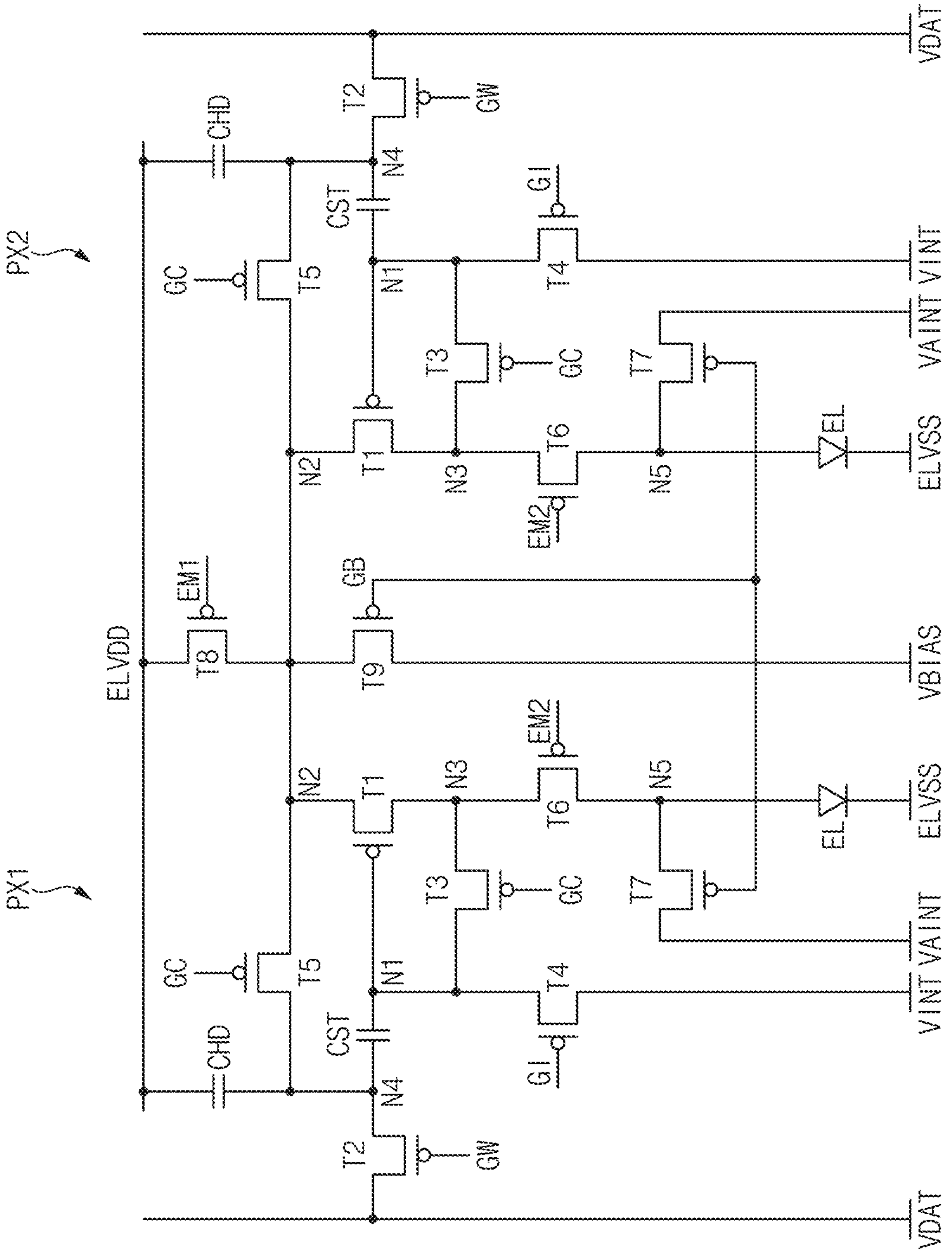
FIG. 21 a circuit diagram illustrating an example of first and second pixels included in the display device of FIG. 1.

FIG. 21 a circuit diagram illustrating an example of the first and second pixels PX1 and PX2 included in the display device 100 of FIG. 1.

Descriptions of components of the first and second pixels PX1 and PX2 described with reference to FIG. 21, which are substantially the same as or similar to those of the first and second pixels PX1 and PX2 described with reference to FIGS. 3 and 17, will be omitted.

Referring to FIGS. 1 and 21, each of the first pixel PX1 and the second pixel PX2 may include the first transistor T1, the second transistor T2, the third transistor T3, the fourth transistor T4, the fifth transistor T5, the sixth transistor T6, the seventh transistor T7, the storage capacitor CST, the hold capacitor CHD, and the light emitting element EL. The first pixel PX1 and the second pixel PX2 may share two transistors. The first pixel PX1 and the second pixel PX2 may share the eighth transistor T8 and the ninth transistor T9.

The fifth transistor T5 may include a gate receiving the second gate signal GC, a source connected to the second node N2, and a drain connected to the fourth node N4. The fifth transistor T5 may connect the second node N2 and the fourth node N4 in response to the second gate signal GC.

In an embodiment described with reference to FIG. 21, the first pixel PX1 and the second pixel PX2 may share two transistors T8 and T9 connected to the second node N2 (or the sources of the first transistors T1). Accordingly, the number of transistors included in the first pixel PX1 and the second pixel PX2 may decrease by two, and the resolution of the display device 100 may increase.

Figure 22:
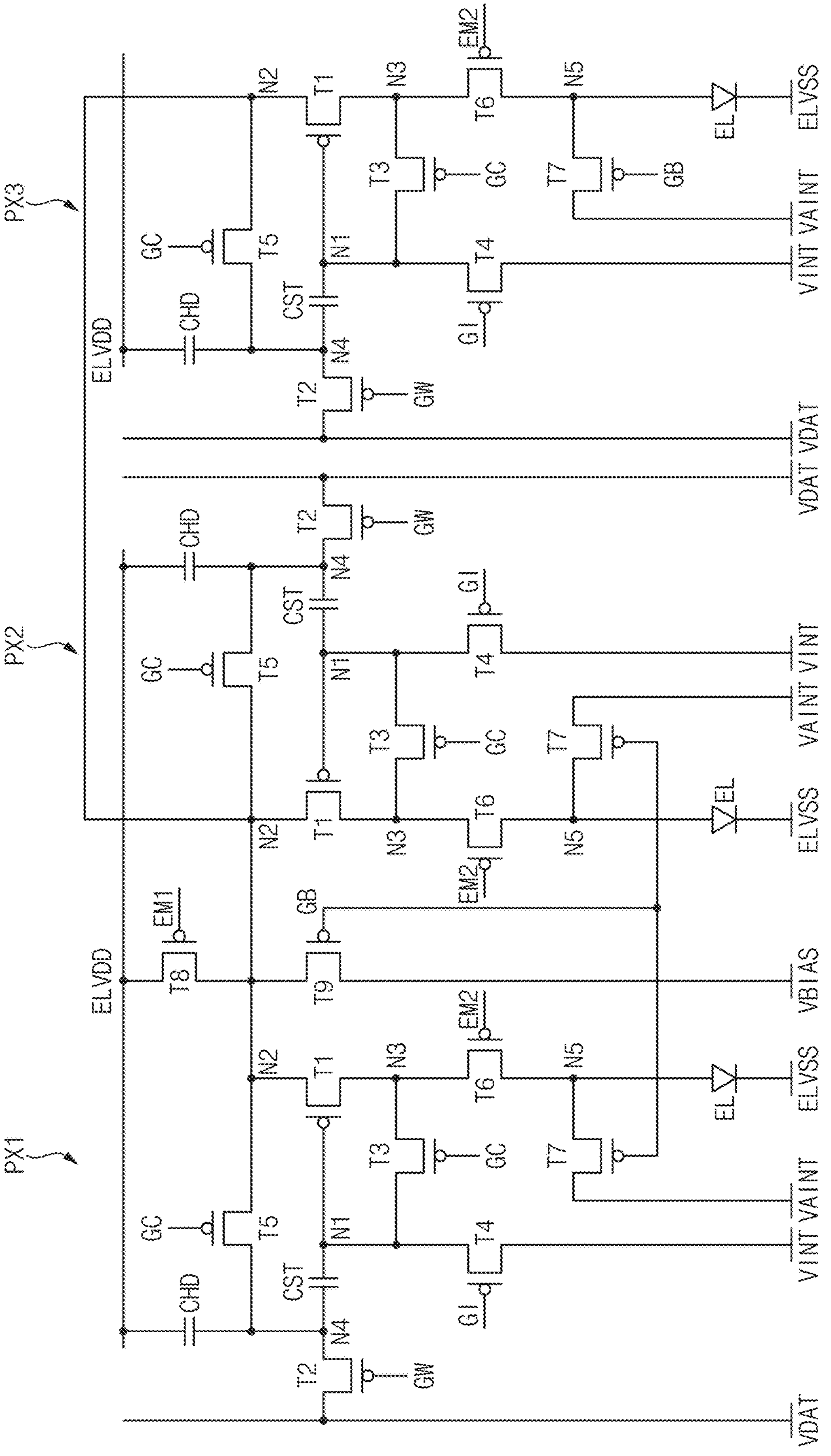
FIG. 22 is a circuit diagram illustrating an example of first to third pixels included in the display device of FIG. 1.

FIG. 22 is a circuit diagram illustrating an example of the first pixel PX1, the second pixel PX2, and the third pixel PX3 included in the display device 100 of FIG. 1.

Descriptions of components of the first pixel PX1, the second pixel PX2, and the third pixel PX3 described with reference to FIG. 22, which are substantially the same as or similar to the first and second pixels PX1 and PX2 described with reference to FIG. 21, will be omitted.

Referring to FIGS. 1 and 22, each of the first pixel PX1, the second pixel PX2, and the third pixel PX3 may include the first transistor T1, the second transistor T2, the third transistor T3, the fourth transistor T4, the fifth transistor T5, the sixth transistor T6, the seventh transistor T7, the storage capacitor CST, the hold capacitor CHD, and the light emitting element EL. The first pixel PX1, the second pixel PX2, and the third pixel PX3 may share two transistors. The first pixel PX1, the second pixel PX2, and the third pixel PX3 may share the eighth transistor T8 and the ninth transistor T9.

In an embodiment described with reference to FIG. 22, the first pixel PX1, the second pixel PX2, and the third pixel PX3 may share two transistors T8 and T9 connected to the second node N2 (or the sources of the first transistors T1). Accordingly, the number of transistors included in the first pixel PX1, the second pixel PX2, and the third pixel PX3 may decrease by four, and the resolution of the display device 100 may increase.

Figure 23:
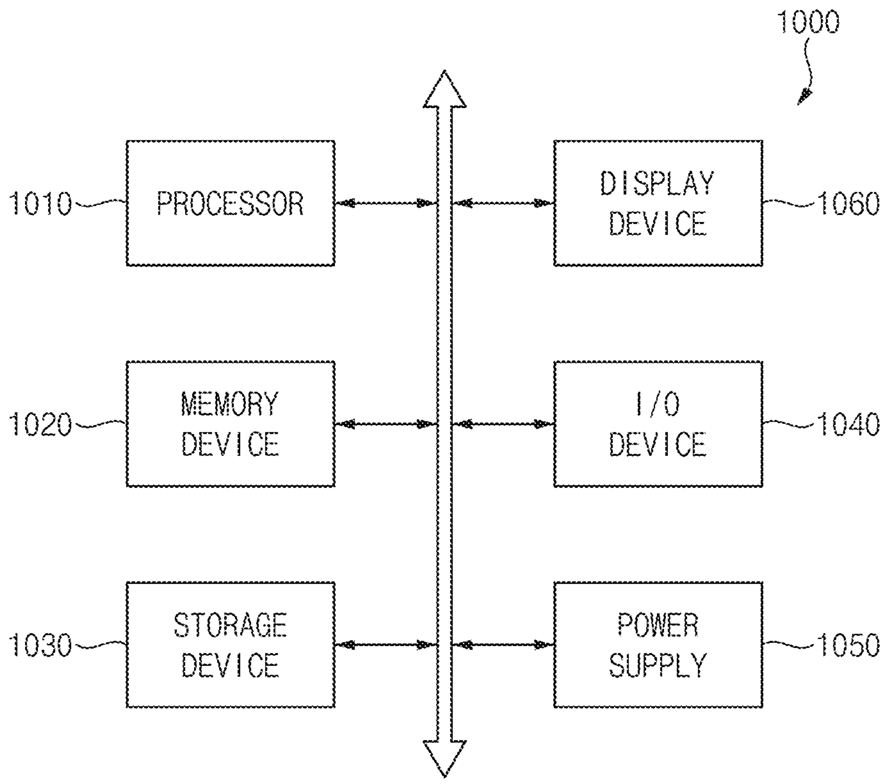
FIG. 23 is a block diagram illustrating an electronic apparatus according to an embodiment.

FIG. 23 is a block diagram illustrating an electronic apparatus 1000 according to an embodiment.

Referring to FIG. 23, the electronic apparatus 1000 may include a processor 1010, a memory device 1020, a storage device 1030, an input/output (I/O) device 1040, a power supply 1050, and a display device 1060. The electronic apparatus 1000 may further include a plurality of ports capable of communicating with a video card, a sound card, a memory card, a USB device, and the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be connected to an expansion bus such as, for example, a peripheral component interconnect (PCI) bus. In an embodiment, the processor 1010 may provide the first image data (IMD1 of FIG. 1) and the control signal (CNT of FIG. 1) to the display device 1060.

The memory device 1020 may store data required for an operation of the electronic apparatus 1000. For example, the memory device 1020 may include: a nonvolatile memory device such as, for example, an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as, for example, a dynamic random access memory (DRAM), a static random access memory (SRAM), or a mobile DRAM.

The storage device 1030 may include a solid state drive (SSD), a hard disk drive (HDD), a CD-ROM, and the like. The I/O device 1040 may include: an input device such as, for example, a keyboard, a keypad, a touch pad, a touch screen, or a mouse; and an output device such as, for example, a speaker or a printer. The power supply 1050 may supply a power required for the operation of the electronic apparatus 1000. The display device 1060 may be connected to other components through the buses or other communication links. The display device 1060 may correspond to the display device 100 of FIG. 1.

At least two pixels among a plurality of pixels included in the display device 1060 may share at least two transistors connected to a source of a first transistor (or a second node), such that the number of transistors included in the pixel may decrease. Accordingly, the resolution of the display device 1060 may increase.

The display device according to the embodiments may be applied to a display device included in a computer, a notebook, a mobile phone, a smart phone, a smart pad, a smart watch, a PMP, a PDA, an MP3 player, or the like.

Although the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising a plurality of pixels, each of the plurality of pixels comprising:

a first transistor comprising a gate connected to a first node, a source connected to a second node, and a drain connected to a third node;

a second transistor comprising a gate configured to receive a first gate signal, a source configured to receive a data voltage, and a drain connected to a fourth node;

a third transistor comprising a gate configured to receive a second gate signal, a source connected to the third node, and a drain connected to the first node;

a storage capacitor comprising a first terminal connected to the first node and a second terminal directly connected to the fourth node; and a light emitting element comprising a first terminal connected to a fifth node and a second terminal configured to receive a second power voltage, wherein at least two pixels among the plurality of pixels share at least two transistors connected to the second node, and the at least two transistors are different from the second transistor.

2. The display device of claim 1, wherein the plurality of pixels comprise a first pixel and a second pixel disposed in a same pixel row and adjacent to each other, and wherein the first pixel and the second pixel share the at least two transistors.

3. The display device of claim 2, wherein the first pixel is a first one of a red pixel, a green pixel, and a blue pixel, and wherein the second pixel is a second one of the red pixel, the green pixel, and the blue pixel.

4. The display device of claim 1, wherein the plurality of pixels comprise a first pixel, a second pixel, and a third pixel disposed in a same pixel row and adjacent to each other, and wherein the first pixel, the second pixel, and the third pixel share the at least two transistors.

5. The display device of claim 4, wherein the first pixel is a first one of a red pixel, a green pixel, and a blue pixel, wherein the second pixel is a second one of the red pixel, the green pixel, and the blue pixel, and wherein the third pixel is a third one of the red pixel, the green pixel, and the blue pixel.

6. The display device of claim 1, wherein the at least two transistors comprise:

an eighth transistor comprising a gate configured to receive a first emission signal, a source configured to receive a first power voltage, and a drain connected to the second node; and a ninth transistor comprising a gate configured to receive a fourth gate signal, a source configured to receive a bias voltage, and a drain connected to the second node.

7. The display device of claim 6, wherein the at least two transistors further comprise:

a tenth transistor comprising a gate configured to receive the second gate signal, a source configured to receive the first power voltage, and a drain connected to the second node.

8. The display device of claim 7, wherein each of the plurality of pixels further comprises:

a fifth transistor comprising a gate configured to receive the second gate signal, a source configured to receive a reference voltage, and a drain connected to the fourth node;

a sixth transistor comprising a gate configured to receive the first emission signal, a source connected to the third node, and a drain connected to the fifth node; and a seventh transistor comprising a gate configured to receive the fourth gate signal, a source configured to receive a second initialization voltage, and a drain connected to the fifth node.

9. The display device of claim 6, wherein each of the plurality of pixels further comprises:

a sixth transistor comprising a gate configured to receive a second emission signal, a source connected to the third node, and a drain connected to the fifth node; and a seventh transistor comprising a gate configured to receive the fourth gate signal, a source configured to receive a second initialization voltage, and a drain connected to the fifth node.

10. The display device of claim 9, wherein each of the plurality of pixels further comprises:

a fifth transistor comprising a gate configured to receive the second gate signal, a source configured to receive a reference voltage, and a drain connected to the fourth node.

11. The display device of claim 9, wherein each of the plurality of pixels further comprises:

a fifth transistor comprising a gate configured to receive the second gate signal, a source connected to the second node, and a drain connected to the fourth node.

12. The display device of claim 1, wherein each of the plurality of pixels further comprises:

a fourth transistor comprising a gate configured to receive a third gate signal, a source configured to receive a first initialization voltage, and a drain connected to the first node; and a hold capacitor comprising a first terminal connected to the fourth node and a second terminal configured to receive a first power voltage.

13. A display device comprising a plurality of pixels, each of the plurality of pixels comprising:

a first transistor comprising a gate connected to a first node, a source connected to a second node, and a drain connected to a third node;

a second transistor comprising a gate configured to receive a first gate signal, a source configured to receive a data voltage, and a drain connected to a fourth node;

a third transistor comprising a gate configured to receive a second gate signal, a source connected to the third node, and a drain connected to the first node;

a storage capacitor comprising a first terminal connected to the first node and a second terminal directly connected to the fourth node; and a light emitting element comprising a first terminal connected to a fifth node and a second terminal configured to receive a second power voltage, wherein at least two pixels among the plurality of pixels share a ninth transistor comprising a gate configured to receive a fourth gate signal, a source configured to receive a bias voltage, and a drain connected to the second node, and the at least two transistors are different from the second transistor.

14. The display device of claim 13, wherein the at least two pixels further share a tenth transistor comprising a gate configured to receive the second gate signal, a source configured to receive a first power voltage, and a drain connected to the second node.

15. A display device comprising a first pixel area, a second pixel area, and a third pixel area, each of the first pixel area, the second pixel area, and the third pixel area comprising:

an active layer disposed on a substrate and comprising a first source area, a first drain area, a second source area, a second drain area, a third source area, and a third drain area;

a first conductive layer disposed on the active layer and comprising a first gate electrode which defines a first transistor together with the first source area and the first drain area, a second gate electrode which defines a second transistor together with the second source area and the second drain area, and a third gate electrode which defines a third transistor together with the third source area and the third drain area;

a second conductive layer disposed on the first conductive layer and comprising a first capacitor electrode overlapping the first gate electrode;

a third conductive layer disposed on the second conductive layer and comprising a second capacitor electrode overlapping the first capacitor electrode; and a fourth conductive layer disposed on the third conductive layer, wherein the first pixel area and the second pixel area share the first source area, and wherein the first source area of the third pixel area is connected to the first source area shared by the first pixel area and the second pixel area through a bridge disposed on a layer different from the active layer.

16. The display device of claim 15, wherein the first pixel area, the second pixel area, and the third pixel area are disposed in a same pixel row, and the second pixel area is adjacent the first pixel area and the third pixel area.

17. The display device of claim 16, wherein a shape of the first pixel area and a shape of the second pixel area are symmetrical to each other with respect to an imaginary line extending in a pixel column direction between the first pixel area and the second pixel area.

18. The display device of claim 17, wherein the first pixel area and the third pixel area have a same shape.

19. The display device of claim 15, wherein the fourth conductive layer comprises the bridge.

20. The display device of claim 19, wherein the fourth conductive layer further comprises a first gate line connected to the second gate electrode and a second gate line connected to the third gate electrode.

21. The display device of claim 15, wherein the first source area shared by the first pixel area and the second pixel area comprises a first protrusion extending in a pixel row direction, and wherein a first end portion of the bridge is connected to the first protrusion.

22. The display device of claim 21, wherein the first source area of the third pixel area comprises a second protrusion extending in the pixel row direction, and wherein a second end portion of the bridge is connected to the second protrusion.

23. The display device of claim 15, wherein the active layer of each of the first pixel area and the second pixel area further comprises an eighth source area, an eighth drain area, a ninth source area, a ninth drain area, a tenth source area, and a tenth drain area, and wherein the first pixel area and the second pixel area share the eighth source area, the eighth drain area, the tenth source area, and the tenth drain area.

24. The display device of claim 23, wherein the first conductive layer of each of the first pixel area and the second pixel area further comprises:

an eighth gate electrode which defines an eighth transistor together with the eighth source area and the eighth drain area;

a ninth gate electrode which defines a ninth transistor together with the ninth source area and the ninth drain area; and a tenth gate electrode which defines a tenth transistor together with the tenth source area and the tenth drain area.

25. The display device of claim 15, wherein each of the first pixel area, the second pixel area, and the third pixel area further comprises:

a fifth conductive layer disposed on the fourth conductive layer and comprising a data line electrically connected to the second source area and a power line electrically connected to the second capacitor electrode.

* * * * *